(12) United States Patent
Graefe

(10) Patent No.: US 11,514,014 B2
(45) Date of Patent: Nov. 29, 2022

(54) STAGGERED MERGING IN LOG-STRUCTURED MERGE FORESTS

(71) Applicant: Google LLC, Mountain View, CA (US)

(72) Inventor: Goetz Graefe, Madison, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/059,197

(22) PCT Filed: Sep. 11, 2019

(86) PCT No.: PCT/US2019/050579
§ 371 (c)(1),
(2) Date: Nov. 25, 2020

(87) PCT Pub. No.: WO2020/055977
PCT Pub. Date: Mar. 19, 2020

(65) Prior Publication Data
US 2021/0216517 A1    Jul. 15, 2021

Related U.S. Application Data

(60) Provisional application No. 62/731,630, filed on Sep. 14, 2018.

(51) Int. Cl.
*G06F 16/22* (2019.01)
(52) U.S. Cl.
CPC ...... *G06F 16/2246* (2019.01); *G06F 16/2272* (2019.01)

(58) Field of Classification Search
CPC .......... G06F 16/2228; G06F 16/2246; G06F 16/2272; G06F 16/2282
See application file for complete search history.

(56) References Cited

U.S. PATENT DOCUMENTS 5,852,826 A * 12/1998 Graunke ............... G06F 7/36
8,200,633 B2 * 6/2012 Bendakovsky ..... G06F 11/1469
707/640
9,563,654 B2    2/2017 Zheng et al.
(Continued)

OTHER PUBLICATIONS

Bayer, et al., "Organization and Maintenance of Large Ordered Indexes", Acta Informatica 1, dated 1972 (17 pages).
(Continued)

*Primary Examiner* — James E Richardson
(74) *Attorney, Agent, or Firm* — Dority & Manning, P.A.

(57) ABSTRACT

At least one aspect of the present disclosure is directed to a systems and methods of maintaining key-value stores. The method can include establishing a first run of data records indexed by a key value. The method can include tracking, using an index, a merging of the data records of the first run onto a merge level on a database. The method can include establishing, concurrent to the merging of the first run, a second run of data records indexed by a key value. The method can include determining that the index tracking the merge of the data records of the first run onto the merge level satisfies a quantile condition. The method can include adding the subset of the second plurality of records of the second run to the merging of the first plurality of records of the first run onto the merge level maintained on the database.

20 Claims, 19 Drawing Sheets

(56) References Cited

U.S. PATENT DOCUMENTS

| | | | | |
|---|---|---|---|---|
| 2011/0055232 | A1* | 3/2011 | Graefe | G06F 12/08 |
| | | | | 707/752 |
| 2016/0321323 | A1* | 11/2016 | Gaumnitz | G06F 16/2272 |
| 2017/0212891 | A1 | 7/2017 | Pundir et al. | |
| 2018/0314465 | A1* | 11/2018 | Mittal | G06F 7/36 |
| 2020/0372004 | A1* | 11/2020 | Barber | G06F 16/2255 |

OTHER PUBLICATIONS

Bayer, et al., "Prefix B-Trees", ACM Transactions on Database Systems, dated Mar. 1977 (16 pages).

Bloom, Burton H., "Space/Time Trade-Offs in Hash Coding with Allowable Errors", Communications of the ACM, dated Jul. 1970 (5 pages).

Comer, Douglas, "The Ubiquitous B-Tree", Computing Surveys, dated Jun. 1979 (17 pages).

Conner, W.M., "Offset Value Coding", IBM Technical Disclosure Bulletin, dated Dec. 1977 (8 pages).

Graefe, et al., "Fast Loads and Queries", TLDKS II, LNCS 6380, dated 2010 (42 pages).

Graefe, et al., "Self-Selecting, Self-Tuning, Incrementally Optimized Indexes", EDBT, dated Mar. 22, 2010 (11 pages).

Graefe, Goetz, "Modern B-tree Techniques", Foundations and Trends in Databases, dated 2011 (203 pages).

Graefe, Goetz, "Write-Optimized B-Trees", VLDB Conference, dated 2004 (12 pages).

Gray, Jim, Notes on Data case operating Systems, Advanced course on operating systems, Springer LNCS #60, dated 1978 (89 pages).

Idreos, et al., "Database Cracking", CIDR, dated 2007 (11 pages).

International Search Report on PCT PCT/US2019/050579 dated Nov. 27, 2019.

Iyer, Balakrishna, "Hardware Assisted Sorting in IBM's DB2 DBMS", COMAD, Hyderabad, India, dated Dec. 20, 2005 (9 pages).

Leslie, et al., "Efficient Search of Multi dimensional B-Trees", VLDB Conference, dated 1995 (10 pages).

Mohan, et al., "ARIES: A Transaction Recovery Method Supporting Fine-Granularity Locking and Partial Rollbacks Using Write-Ahead Logging", ACM Transactions on Database Systems, dated Mar. 1992 (69 pages).

O'Neil, et al., "The Log-Structured Merge-Tree (LSM-Tree)", Acta Informatica 33, dated 1996 (35 pages).

O'Neil, Patrick E., "The SB-Tree: An Index-Sequential Structure For High-Performance Sequential Access", Acta Informatica 29, dated 1992 (25 pages).

Sears, et al., "bLSM: A General Purpose Log Structured Merge Tree", ACM SIGMOD, dated May 20, 2012 (12 pages).

Seeger, et al., "Waves of Misery After Index Creation", Technologie und Web, dated Jun. 2019 (20 pages).

Selinger, et al., "Access Path Selection in a Relational Database Management System", ACM SIGMOND, dated 1979 (12 pages).

Written Opinion of the International Searching Authority on PCT PCT/US2019/050579 dated Nov. 27, 2019.

International Preliminary Report on Patentability for PCT Appln. Ser. No. PCT/US2019/050579 dated Mar. 25, 2021 (10 pages).

Jermaine et al., "The partitioned exponential file for database storage management", The VLDDB Journal, The International Journal on Very Large Data Bases, vol. 16, No. 4, Jul. 26, 2006, pp. 417-437 (21 pages).

Graefe, "Algorithms for merged indexes", Database Systems in Business, Technology and Web (BTW 2007)—12. Conference of the GI department "Databases and Information Systems" (DBIS) (2007), (20 pages).

* cited by examiner

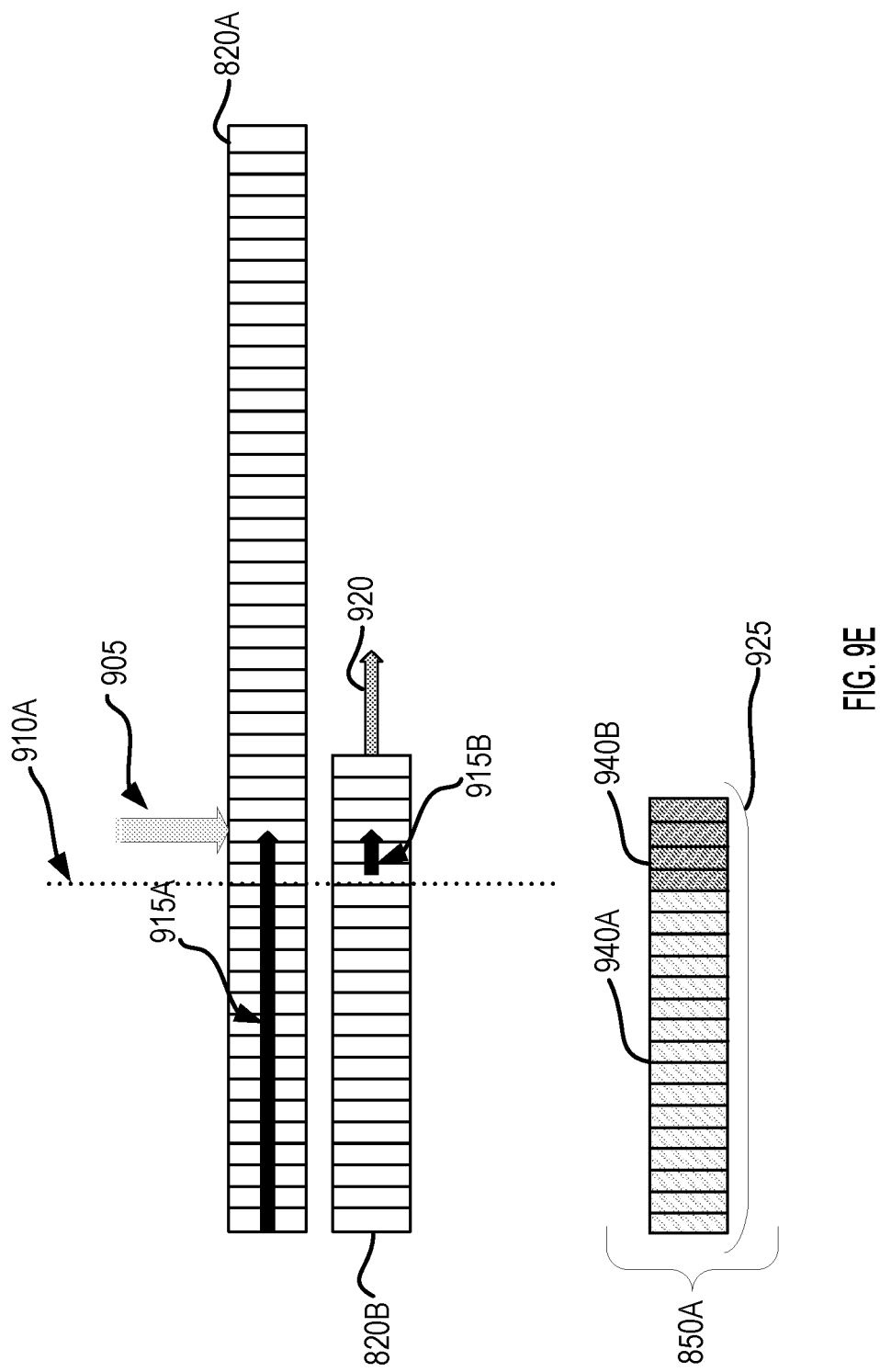

STAGGERED MERGING IN LOG-STRUCTURED MERGE FORESTS

CROSS-REFERENCE TO RELATED APPLICATIONS

The present application is a National Stage Application, filed under 35 U.S.C. 371, of International Patent Application No. PCT/US2019/050579 filed on Sep. 11, 2019 titled "STAGGERED MERGING IN LOG-STRUCTURED MERGE FORESTS," which in turn claims priority to U.S. Application No. 62/731,630 filed Sep. 14, 2018, titled "STAGGERED MERGING IN LOG-STRUCTURE INDEXES," the entireties of which are incorporated by reference herein.

BACKGROUND

Data may be maintained and indexed in a database. Certain large indexed databases may implement a large insert volume. Databases may handle queries to search for one or more entries in the database.

SUMMARY

At least one aspect of the present disclosure is directed to a method of maintaining key-value stores. The method can include establishing, by a data processing system having one or more processors, on a first buffer, a first run for sorting a first plurality of records. The first plurality of records can be initially indexed by a first corresponding plurality of index values. Each record of the first plurality of records can have a first key value in a key domain. The key domain can define a plurality of key values. The method can include tracking, by the data processing system, using a merge index, a merging of the first plurality of records of the first run onto a merge level maintained on a database. The merge index can reference the first key value of a record of the first plurality of records added to the merge level during the merging. The method can include establishing, by the data processing system, concurrent to the merging of the first plurality of records, a second run for sorting a second plurality of records on a second buffer. The second plurality of records can be indexed by a second corresponding plurality of index values different from the first plurality of index values. Each record of the second plurality of records can have a second key value in the key domain. The method can include determining, by the data processing system, that the merge index tracking the merge of the first plurality of records onto the merge level satisfies a quantile condition. The quantile condition can correspond to at least one of the plurality of key values in the key domain. The method can include identifying, by the data processing system, responsive to determining that the merge index corresponds to the quantile condition, a subset of the second plurality of records of the second run from the second buffer. Each record of the subset can have the corresponding second key value satisfying the quantile condition. The method can include adding, by the data processing system, the subset of the second plurality of records of the second run to the merging of the first plurality of records of the first run onto the merge level maintained on the database.

In some implementations, the method can include determining, by the data processing system, a switch-over key value based on a ratio of the merge index and a quantile index specified by the quantile condition. In some implementations, the method may further comprise determining, by the data processing system, a bandwidth offset based on a merge bandwidth of the database. The merge bandwidth can indicate a rate at which the database is adding the first plurality of records and the subset of the second plurality of records is merged. In some implementations, determining that the merge index satisfies the quantile condition can include determining that the merge index satisfies the switch-over key value adjusted by the bandwidth offset.

In some implementations, the method can include tracking, by the data processing system, using a run index, establishing of the second run using the second plurality of records. The run index can reference a number of the second plurality of records sorted in the second run. In some implementations, the method can include determining, by the data processing system, that the second key value of a record of the second plurality of records referenced by the run index has satisfies the quantile condition. In some implementations, adding the subset of the second plurality of records can include initiating the adding of the subset of the second plurality of records of the second run to the merging, concurrent to establishing of the second run and responsive to determining that second key value of the record referenced by the run index satisfies the quantile condition.

In some implementations, the method can further comprise identifying, by the data processing system, a first run generation rate of establishing the first run on the first buffer. The first run generation rate can indicate a speed at which records of the first plurality of record are sorted in the first run. In some implementations, the method can include identifying, by the data processing system, a second run generation rate of establishing the second run on the second buffer. The second run generation rate can indicate a speed at which records of the second plurality of record are sorted in the second run. In some implementations, the method can include setting, by the data processing system, a merge bandwidth for adding the first plurality of records of the first run onto the database based on at least one of the first run generation rate and the second run generation rate.

In some implementations, the method may further comprise identifying, by the data processing system, a distribution of a corresponding plurality of first key values over the key domain for the first plurality of records. In some implementations, the method can further comprise determining, by the data processing system, a plurality of quantile conditions including the quantile condition based on the distribution of the corresponding plurality of first key values over the key domain.

In some implementations, the method can include determining, by the data processing system, while merging the subset of the second plurality of records and the first plurality of records on the merge level, that all of the first plurality of records of the first run are added to the merge level on the database. In some implementations, the method can include releasing, by the data processing system, responsive to determining that all of the first plurality of records of the first run are added, the first buffer from the first plurality of records to receive a third plurality of records for a third run. In some implementations, the method can include maintaining, by the data processing system, the second plurality of records on the second buffer concurrent to merging the subset of the second plurality of records onto the merge level on database.

In some implementations, the method can include determining, by the data processing system, that the merging of the first plurality of records and the subset of the second plurality of records onto the merge level on the database is complete. In some implementations, the method can include initializing, by the data processing system, responsive to determining that the merging onto the merge level is complete, a second merge level on the database to receive merging of at least a remainder subset of the second plurality of records of the second run.

In some implementations, the method can include receiving, by the data processing system, a query for at least one of the plurality of key values defining the key domain. In some implementations, the method can include searching, by the data processing system, using the query, the merge level on the database, the merge level comprising records from a number of runs.

In some implementations, merging the subset of the second plurality of records further comprises tracking, using a second merge index, merging of the subset of the second plurality of records onto the merge level on the database. The second merge index can reference the second key value of one of the second plurality of records added to the merge level during the merging. The second merge index can be initially set based on the quantile condition.

In some implementations of the method, establishing the first run can include sorting the first plurality of records by a corresponding plurality of first key values over the key domain using at least one of a quick sort or a priority queue. The first plurality of records can be initially arranged by the first corresponding plurality of index values. In such implementations of the method, establishing the second run can include receiving, from a data acquisition source via an input data stream, the second plurality of records for storage on the second buffer. The second plurality of records can be initially arranged by the second corresponding plurality of index values, and sorting the second plurality of records by a corresponding plurality of second key values over the key domain using at least one of a quick sort or a priority queue.

At least one other aspect of the present disclosure is directed to a system for maintaining key-value stores, comprising a data processing system having one or more processors. The data processing system can establish, on a first buffer, a first run for sorting a first plurality of records. The first plurality of records can be initially indexed by a first corresponding plurality of index values. Each record of the first plurality of records can have a first key value in a key domain. The key domain can define a plurality of key values. The data processing system can track, using a merge index, merging of the first plurality of records of the first run onto a merge level maintained on a database. The merge index referencing the first key value of a record of the first plurality of records added to the merge level during the merging. The data processing system can establish, concurrent to the merging of the first plurality of records, a second run for sorting a second plurality of records. The second plurality of records can be indexed by a second corresponding plurality of index values different from the first plurality of index values. Each record of the second plurality of records can have a second key value in the key domain. The data processing system can determine that the merge index tracking the merge of the first plurality of records onto the merge level satisfies a quantile condition. The quantile condition can correspond to at least one of the plurality of key values in the key domain. The data processing system can identify, responsive to determining that the merge index corresponds to the quantile condition, a subset of the second plurality of records of the second run from the second buffer. Each record of the subset can have the corresponding second key value satisfying the quantile condition. The data processing system can add the subset of the second plurality of records of the second run to the merging of the first plurality of records of the first run onto the merge level maintained on the database.

In some implementations, the data processing system is further configured to determine a switch-over key value based on a ratio of the merge index and a quantile index specified by the quantile condition. In some implementations, the data processing system can determine a bandwidth offset based on a merge bandwidth of the database. The merge bandwidth can indicate a rate at which the database is adding the first plurality of records and the subset of the second plurality of records is merged. In some implementations, the data processing system can determine that the merge index satisfies the switch-over key value adjusted by the bandwidth offset.

In some implementations, the data processing system can track, using a run index, establishing of the second run using the second plurality of records. The run index referencing a number of the second plurality of records sorted in the second run. In some implementations, the data processing system can determine that the second key value of a record of the second plurality of records referenced by the run index has satisfies the quantile condition. In some implementations, the data processing system can initiate the adding of the subset of the second plurality of records of the second run to the merging, concurrent to establishing of the second run and responsive to determining that second key value of the record referenced by the run index satisfies the quantile condition.

In some implementations, the data processing system can identify a first run generation rate of establishing the first run on the first buffer, the first run generation rate indicating a speed at which records of the first plurality of record are sorted in the first run. In some implementations, the data processing system can identify a second run generation rate of establishing the second run on the second buffer. The second run generation rate can indicate a speed at which records of the second plurality of record are sorted in the second run. In some implementations, the data processing system can set a merge bandwidth for adding the first plurality of records of the first run onto the database based on at least one of the first run generation rate and the second run generation rate.

In some implementations, the data processing system can identify a distribution of a corresponding plurality of first key values over the key domain for the first plurality of records. In some implementations, the data processing system can determine plurality of quantile conditions including the quantile condition based on the distribution of the corresponding plurality of first key values over the key domain.

In some implementations, the data processing system can determine, while merging the subset of the second plurality of records and the first plurality of records on the merge level, that all of the first plurality of records of the first run are added to the merge level on the database. In some implementations, the data processing system can release, responsive to determining that all of the first plurality of records of the first run are added, the first buffer from the first plurality of records to receive a third plurality of records for a third run. In some implementations, the data processing system can maintain the second plurality of records on the second buffer concurrent to merging the subset of the second plurality of records onto the merge level on database.

In some implementations, the data processing system can determine that the merging of the first plurality of records and the subset of the second plurality of records onto the merge level on the database is complete. In some implementations, the data processing system can initialize, responsive to determining that the merging onto the merge level is complete, a second merge level on the database to receive merging of at least a remainder subset of the second plurality of records of the second run.

In some implementations, the data processing system can receive a query for at least one of the plurality of key values defining the key domain. In some implementations, the data processing system can search, using the query, the merge level on the database, the merge level comprising records from a number of runs.

In some implementations, the data processing system can track, using a second merge index, merging of the subset of the second plurality of records onto the merge level on the database. The second merge index can reference the second key value of one of the second plurality of records added to the merge level during the merging. The second merge index can be initially set based on the quantile condition.

In some implementations, the data processing system can sort the first plurality of records by a corresponding plurality of first key values over the key domain using at least one of a quick sort or a priority queue. The first plurality of records can be initially arranged by the first corresponding plurality of index values. In some implementations, the data processing system can receive, from a data acquisition source via an input data stream, the second plurality of records for storage on the second buffer. The second plurality of records can be initially arranged by the second corresponding plurality of index values. In some implementations, the data processing system can sort the second plurality of records by a corresponding plurality of second key values over the key domain using at least one of a quick sort or a priority queue.

Aspects provide staggered merging for merging runs of data, such as records in a database. The staggered merging enables merging to be carried out in a continuous and stable manner as compared to previous methods which may result in bursts of merging operations causing spikes in computational loads which can severely degrade the performance of query operations that are occurring concurrently. The staggering may be based upon a quantile condition, that is, a second run may be added to a current merge when a quantile condition is met during the merge. The quantile condition may determine a subset of the second run data to participate in the merge. The remaining run data of the second run is held back to be merged later, for example, when another quantile condition is met or when the current merge is completed and another merge operation begins. The merging may be hierarchical and arranged into merge levels. The output of a merge at a particular level may provide another run for merging at a next level. Merging at all levels follows a staggered merging. These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs which may be carried on appropriate carrier media (computer readable media) which may be tangible carrier media (e.g. disks) or intangible carrier media (e.g. communications signals). Aspects may also be implemented using suitable apparatus which may take the form of programmable computers running computer programs arranged to implement the aspect.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 9E shows a diagram illustrating a one-way merge becoming a two way merge responsive to the merge index reaching a target quantile in a racing staggered merging.

DETAILED DESCRIPTION

Figure 1:
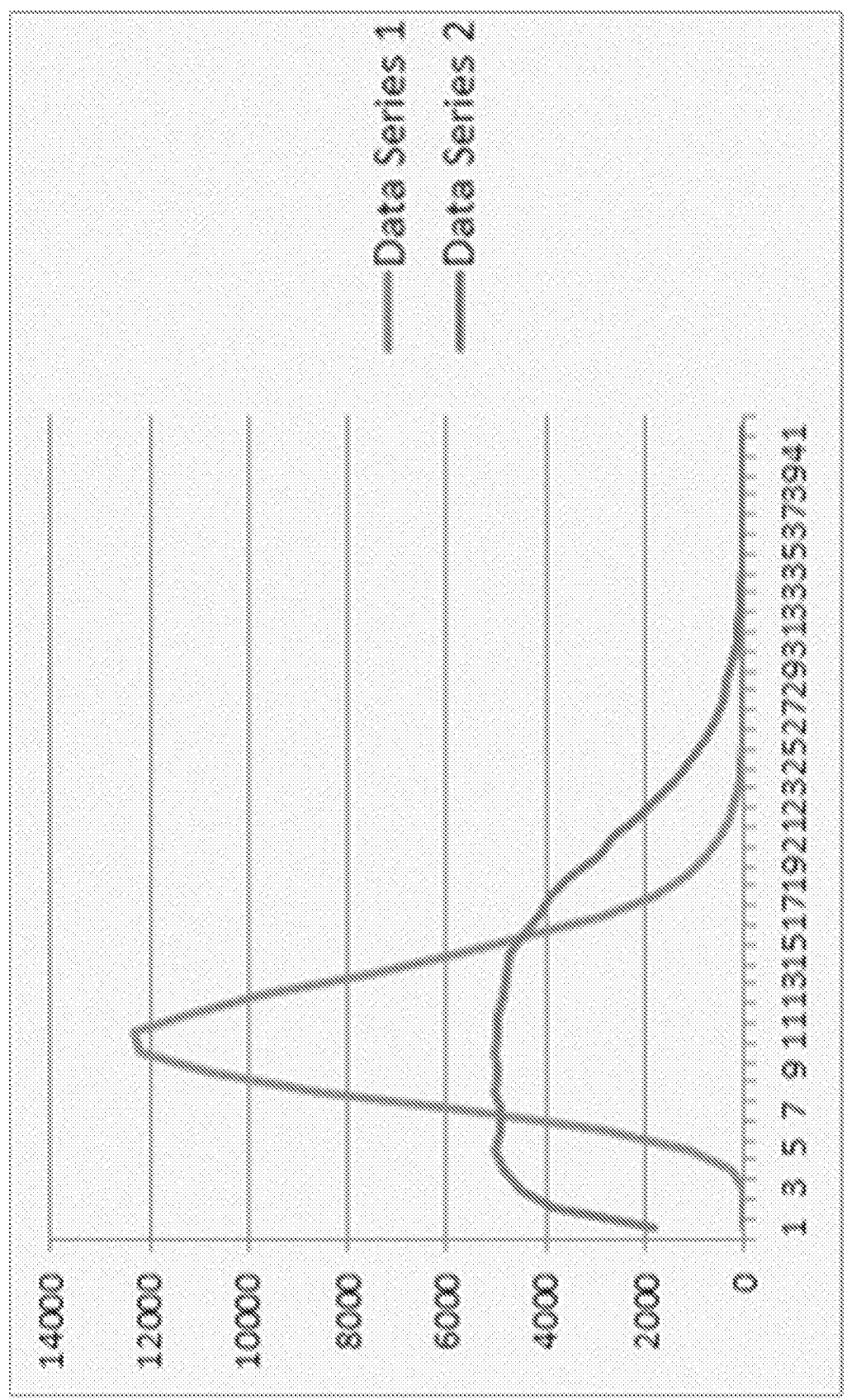
FIG. 1 shows two plots illustrating waves of misery after index creation, using an old policy and a new split policy.

For purposes of reading the description of the various embodiments below, the following descriptions of the sections of the specification and their respective contents may be helpful:

Section A describes staggered merging.

Section B describes maintaining key-value stores by performing staggered merging.

Section C describes a general computer system that may be used to implement one or more of the elements described in the present application.

A. Staggered Merging

Log-structured merge trees (forests) excel at captioning new insertions at high bandwidth but they can involve repeated merge steps in order to reduce the number of b-tree partitions searched in each subsequent query. For effective merge steps, merging kicks in at each level when a sufficient number of runs exist; moreover, occasionally, multiple merge steps across multiple merge levels may follow each other immediately.

Each running merge step increases contention for processor, buffer pool, and I/O paths. These repeated bursts of activity and of contention create waves of reduced query performance and thus waves of user dissatisfaction.

The present disclosure describes a schedule to organize all merge activities in a way that stabilizes and minimizes the number of merge levels and of runs (or partitions) and, at the same time, smooths all merge activity without any significant bursts. Run generation and its bandwidth drive merging at each merge level. One difference with the present approach to other merge strategies is that runs enter a merge step one-at-a-time, not all at once as in all such other merge strategies.

Log-structured merge-trees, e.g., a forest of b-trees or an equivalent partitioned b-tree, are widely used in data management platforms, in particular where high-bandwidth data intake is important, e.g., for the analysis of web logs. In fact, the incessant arrival of log records can stress even massive clusters attempting to capture and index new information on multiple dimensions to enable dashboards and offline analysis.

In other methods, merging runs or partitions are employed occasionally. Not every new run involves a subsequent merge step. Merging can occur in bursts. If the input stream continues, e.g., because the activity generating log records continues, then merging and run generation can occur simultaneously. Every now and then, even multiple merge steps can run concurrently to run generation. With merge activity starting and stopping, concurrent query processing suffers from unpredictable performance and user dissatisfaction becomes unavoidable. Addressing the degradation in query processing performance and user satisfaction calls for a pattern of run generation and merging that can run continuously, efficiently, and with a continuous load on processing, buffer pool, and input/output (I/O) resources.

The current disclosure introduces a schedule (or logics) of run generation and merging, referred to herein as staggered merging. The merge logic can run continuously and with the same bandwidth (e.g., records per second) as run generation. Overall, the merging processes described in this disclosure can be as efficient as in an external merge sort, e.g., in terms of the number of comparisons per record or the number of I/O roundtrips per record.

B-tree indexes are commonly used in databases, key-value stores, file systems, and information retrieval. For instance, B-trees can be used to search or sort data in databases. Also, B-trees can allow for quick and random access to an arbitrary block in a particular file of a file system. B-tree indexes are ubiquitous in databases, key-value stores, file systems, and information retrieval. There are many variants and optimizations of B-tree indexes. For instance, b-tree keys can be multiple columns (e.g., compound indexes), hash values (e.g., ordered hash indexes enable efficient creation, effective interpolation search, and easy phantom protection), space-filling curves (e.g., spatial indexes for multi-dimensional data and query predicates), or heterogeneous keys (e.g., merged indexes or master-detail clustering). Also, both keys and values can be compressed, e.g., as bit vector filters instead of a sequence of row identifiers.

B-tree creation can benefit from sorting but sorting can also benefit from b-trees. For instance, runs in external merge sort in the form of b-trees, or even all runs within a single partitioned b-tree or a linear partitioned b-tree, can enable effective read-ahead during a merge as well as query processing while a merge step is still incomplete. This read-ahead capability is the foundation of log-structured merge-trees, discussed below.

Even if initial b-tree creation leaves some free space in each node, e.g., 10%, insertions can eventually force a wave of node splits. If there is a high correlation between the original key value distribution and key value distribution of insertions, this wave of node splits can be sharp and high. The first waves of node splits can split most or all original b-tree nodes, thus doubling the size of the b-tree. There can be subsequent waves when the size of the b-tree doubles again and again. Waves can become less frequent, less sharp, and less high.

FIG. 1 shows two plots illustrating waves of misery after index creation, using an old policy and a new split policy. Soon after creation of a new b-tree index with some free space in each node, insertions can cause node splits. If the key value distribution of the insertions and of the original b-tree population are highly correlated, node splits (or the call for such splits) can occur in waves. Node splits can impose extra contention on processing, buffer pool, and I/O resources, thus decreasing query processing performance, increasing query latency, and causing user dissatisfaction.

Write-Optimized b-Trees

B-trees incur a high write penalty. Specifically, modifying a single byte, field, or record forces a random page write to persistent storage. Write-optimized b-trees attempt to reduce this cost by turning the random write into a sequential write. More specifically, write-optimized b-trees employ append-only storage at page granularity, tracking new page storage locations within the b-tree structure. Each page movement involves a pointer update in a parent page. Thus, write-optimized b-trees encompass a function of a flash translation layer (FTL). They do not permit neighbor pointers among sibling nodes, nonetheless, they permit comprehensive consistency checks (online/continuous or offline/utility) by fence keys in each page, e.g., copies of branch keys in ancestor pages.

Write-optimized b-trees can suffer from poor scan performance on storage devices with high access latency (e.g., seek and rotation delays). A possible optimization dividing the key range into segments, storing each segment in continuous storage, and recycling replaced pages within a segment. The key range per segment may be dynamic, as the key range per leaf node is dynamic in a b-tree. The resulting design combines elements and advantages of write-optimized b-trees and of SB-trees. On flash storage, segments may coincide with an erasure block.

External Merge Sort

In external merge, there is a wide variety of possible sort keys, as for search keys in b-tree indexes. The principal phases of external merge include run generation and merging. Efficient run generation doubles the average size of each run by replacement selection, also known as run generation with a priority queue or a heap. Efficient merging calls for balanced merging where all key values participate in equal or similar counts of comparisons, and merging with a high fan-in, which also reduces the number of merge levels.

There are multiple policies for interleaving run generation and merging. One policy of interleaving run generation and merging is lazy merging, which includes separate operator phases for run generation, intermediate merge steps, and a final merge step. Among all policies for interleaving run generation and merging, lazy merging involves the largest directory of runs. Another policy on the opposite side of the spectrum of policies is eager merging, where the directory size within each merge level is limited to the fan-in, and a merge step is invoked when the run count on any level reaches the fan-in. Between these two policies, semi-eager merging limits the directory size at each level to twice the fan-in and semi-lazy merging uses a single directory across all levels and limits its size, merging runs of similar size whenever the directory is full. Most database products use lazy merging. Most log-structured merge-trees like Napa employ eager merging. SQL Server used to use semi-lazy merging. Volcano used semi-eager merging.

Both run generation and merging can integrate grouping, such as the duplicate removal or aggregation. Grouping during run generation enables in-memory grouping for any input size as long as the final output fits in memory. Grouping while writing runs ensures that no run contains duplicate key values and that no run is larger than the final output.

Log-Structured Merge Forests

If most updates in a b-tree index are insertions, the most promising storage structure is a log-structured merge-tree, which is either a collection of trees (a forest) or, using an artificial leading key field as partition identifiers, a partitioned b-tree.

Log-structured merge forests are widely used in NoSQL databases, key-value storage, and applications that consume and index continuous data streams. Their in-memory index for the most recent unsorted input data mirrors external merge sort with an in-memory index for run generation (as opposed to quicksort in read-sort-write cycles or a priority queue for replacement selection). The use of merging b-trees or b-tree partitions mirrors merging in external merge sort. One difficult issue may include the choice of the merge fan-in. In external merge sort, the fan-in is limited by the memory available for input buffers. In log-structured merge forests, the fan-in is determined by a tension between a high fan-in for best merge efficiency and a low fan-in such that few partitions exist at any time and queries are to inspect few partitions. Some real-world implementations of log-structured merge forest employ binary merge steps, thus favoring query performance over merge efficiency.

There is another issue heretofore ignored. Eager merge steps create a wild load fluctuation with sometime no merge active, sometimes one, sometimes multiple merge steps.

Figure 2:
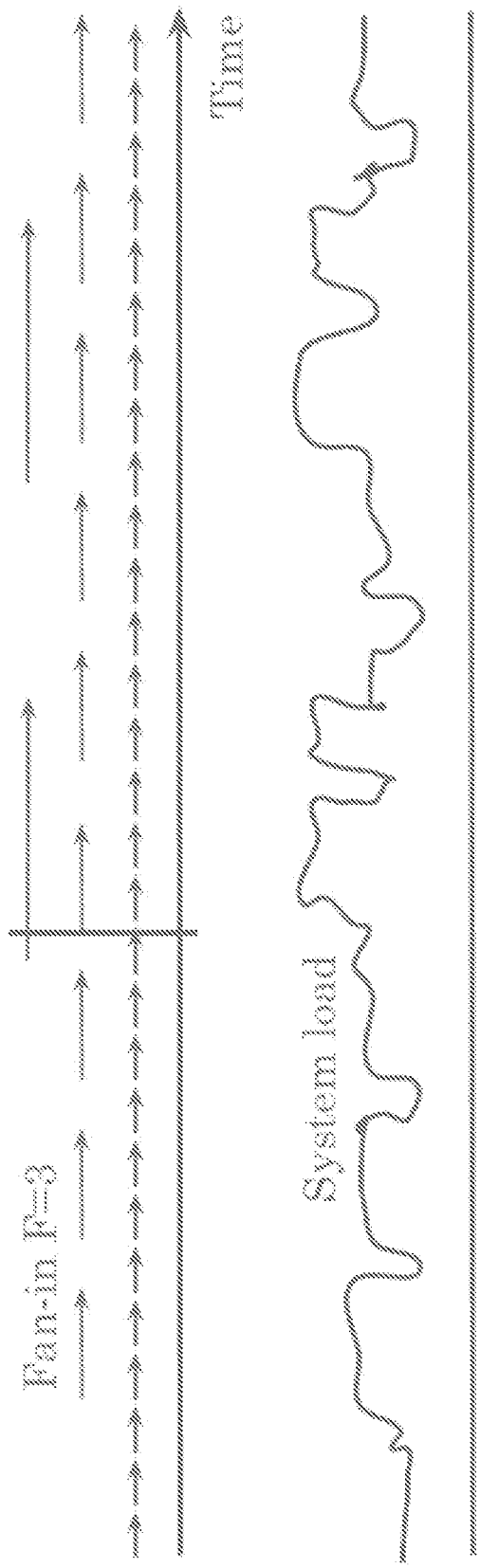
FIG. 2 is a diagram illustrating the waves of load due to occasional merge steps, sometimes even on multiple merge levels at the same time.

FIG. 2 is a diagram illustrating the waves of load due to occasional merge steps, sometimes even on multiple merge levels at the same time. It seems highly desirable to enable better tradeoffs between merge efficiency, query responsiveness (latency), and continuous system load.

Staggered Merging

Staggered merging includes integrating each completed run into its next merge step immediately. For example, whenever run generation completes a level-0 run, the merge step forming a level-1 run picks it up immediately. When a level-1 run is complete, the merge step picks it up immediately, and so on and so forth. If the time run generation produces a full set of level-0 runs, e.g., as many as the desired merge fan-in F, the merge step can consume and merge the same data volume.

As compared to external merge sort, a difference is that each run permits seeking to a specific key value and continuing a sorted scan from there. Thus, each run is not a sorted file but a b-tree or an equivalent storage structure. In fact, the set of runs at the same level within the merge logic could be a single linear partitioned b-tree. If so, the root-to-leaf search can occur entirely in memory.

Steady State at Each Merge Level

In the steady state, there exist F completed level-0 runs plus one incomplete one being formed by run generation. When run generation completes one run and progresses to the next one, the newly completed one immediately joins the merge logic. In order to enable that, a prior run drops out of the merge logic. Since the merge logic progress through the key domain once while run generation creates F new runs, the principle may be that a newly completed run does not join the merge logic with its lowest key value but with the key value currently being merged. Thus, most runs participate in two merge steps: the first merge step consumes all key values higher than a given switch-over key value, the second merge step consumes all key values lower than the switch-over key value.

There is a different switch-over key value for each one of the F merge inputs. Ideally, the switch-over key values are chosen to approximate the quantiles. One merge input may switch at a time. Initial switch-over key values can be set during the first merge step. They can be adjusted incrementally.

Figure 3A:
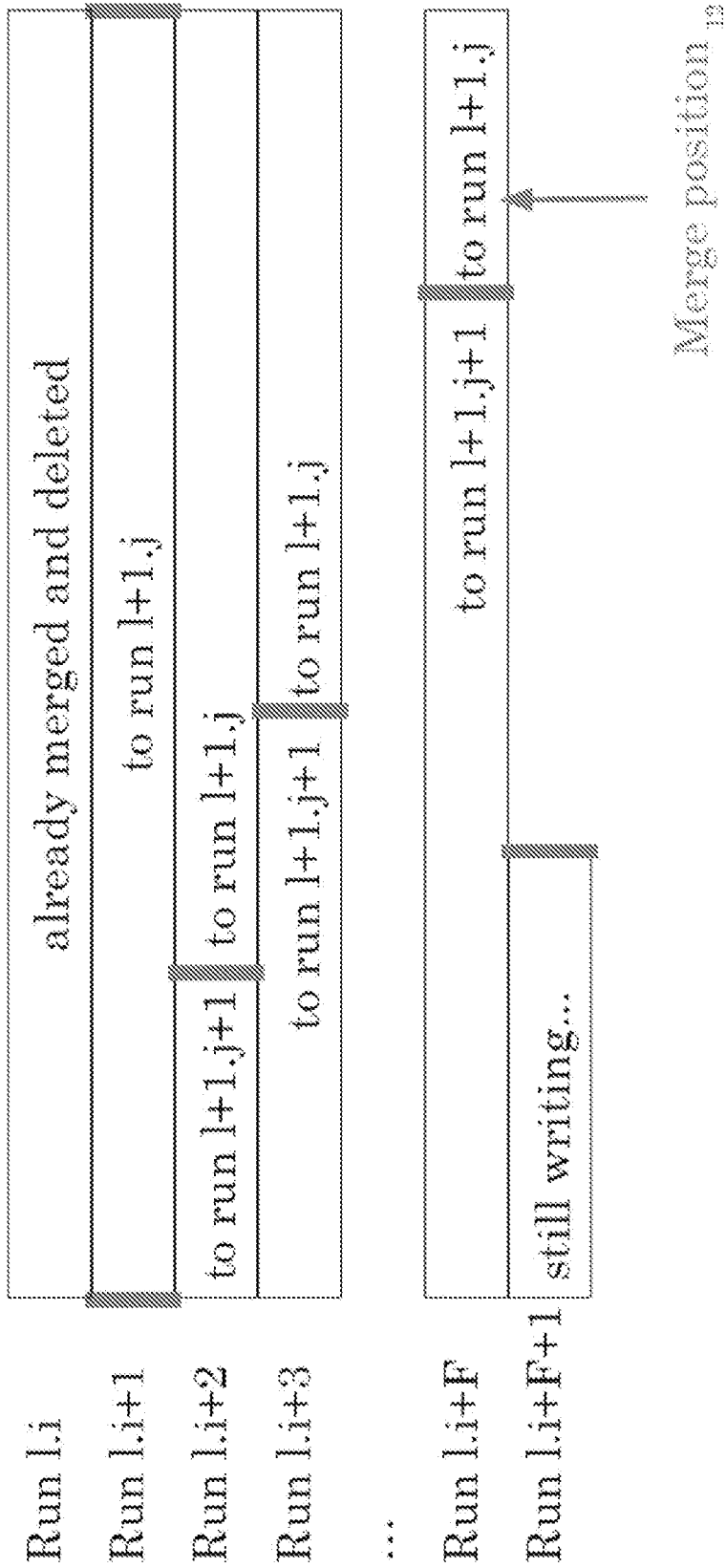
FIGS. 3A and 3B show diagrams illustrating a merge step reading F runs on merge level l and writing a new run on merge level l+1.
Figure 3B:
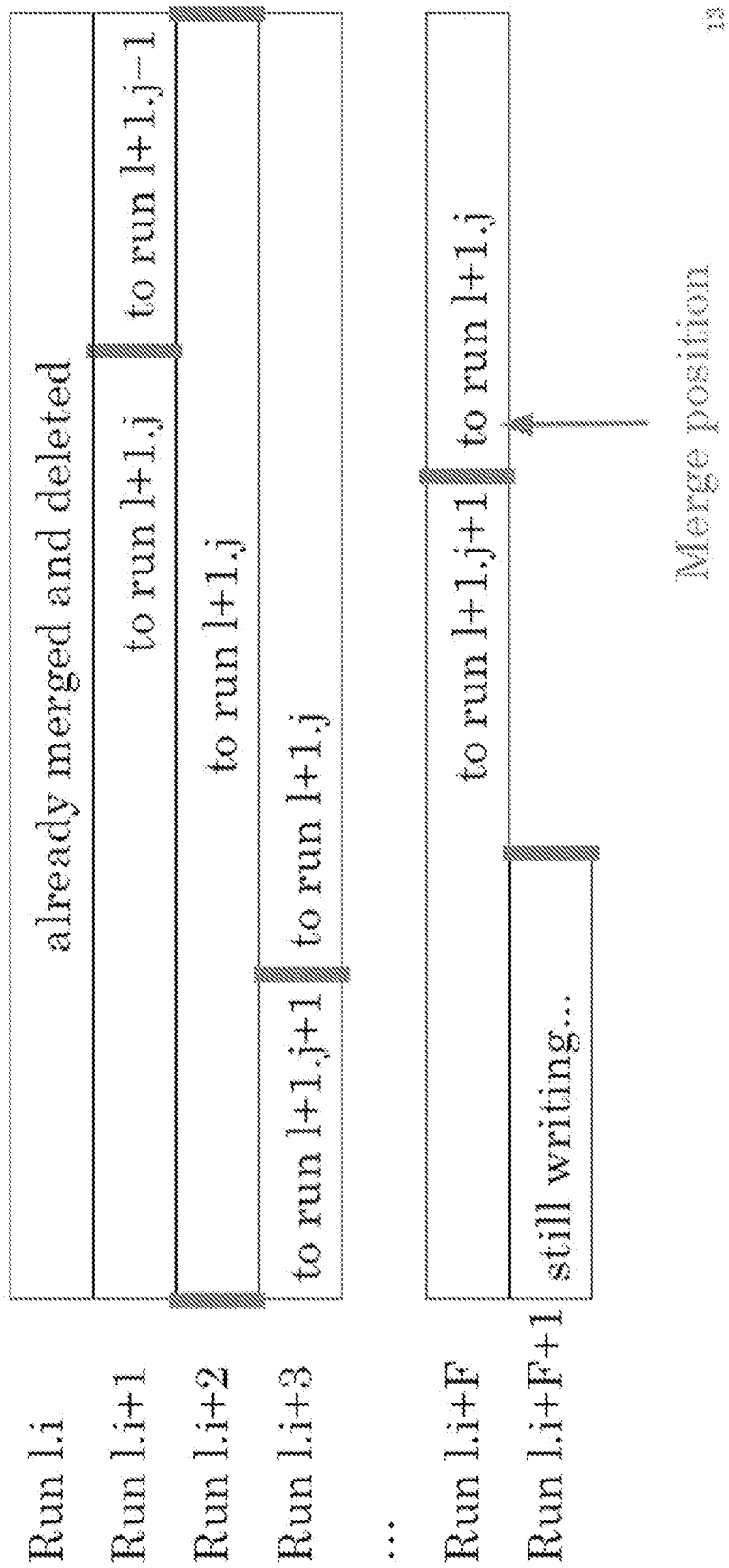

FIGS. 3A and 3B show diagrams illustrating a merge step reading F runs on merge level l and writing a new run on merge level l+1. Run i and earlier have already been merged, their contents can be found at level l+1, and the runs are therefore already deleted and their space on temporary storage reclaimed. The merge logic currently consumes records from runs i+1 to i+F. Merging (from merge level l−1) or run generation (if l=0) continues to add runs at level l, currently writing run i+F+1. The merge logic added run i+1 at −∞, run i+2 etc. as the merge progressed through the key domain, and most recently run i+F.

The merge logic is currently approaching +∞. That should coincide with run generation or the lower-level merge finishing run i+F+1. At that point, run creation on level l will switch to run i+F+2. The merge from level l to level l+1 will drop (and delete) run i+1, add run i+F+1, wrap from +∞ to −∞ in runs i+2 to i+F, finish run j on merge level l+1 and switch to run j+1, and resume merging.

Initialization of Each Merge Level

As soon as run generation completes its first run, merging commences. At first, the merge fan-in is 1. When run generation completes its second run, the merge logic should have reached the key value equal to the 1/F quantile of the key value distribution. Merging two runs continues from this quantile key value. The first 1/F fraction of the second run is ignored for now; it will go into the second merge output run. When run generation completes its third run, the merge logic should have reached the key value equal to the 2/F quantile. Merging three runs continues from this quantile key value.

In this way, the actual merge fan-in grows from 1 to F during the first pass through the key domain. When the merge logic reaches the end of the key domain, one run can be dropped from the merge (and in fact from temporary storage) and the merge logic can add the F+1$^{st}$ run.

Figure 4A:
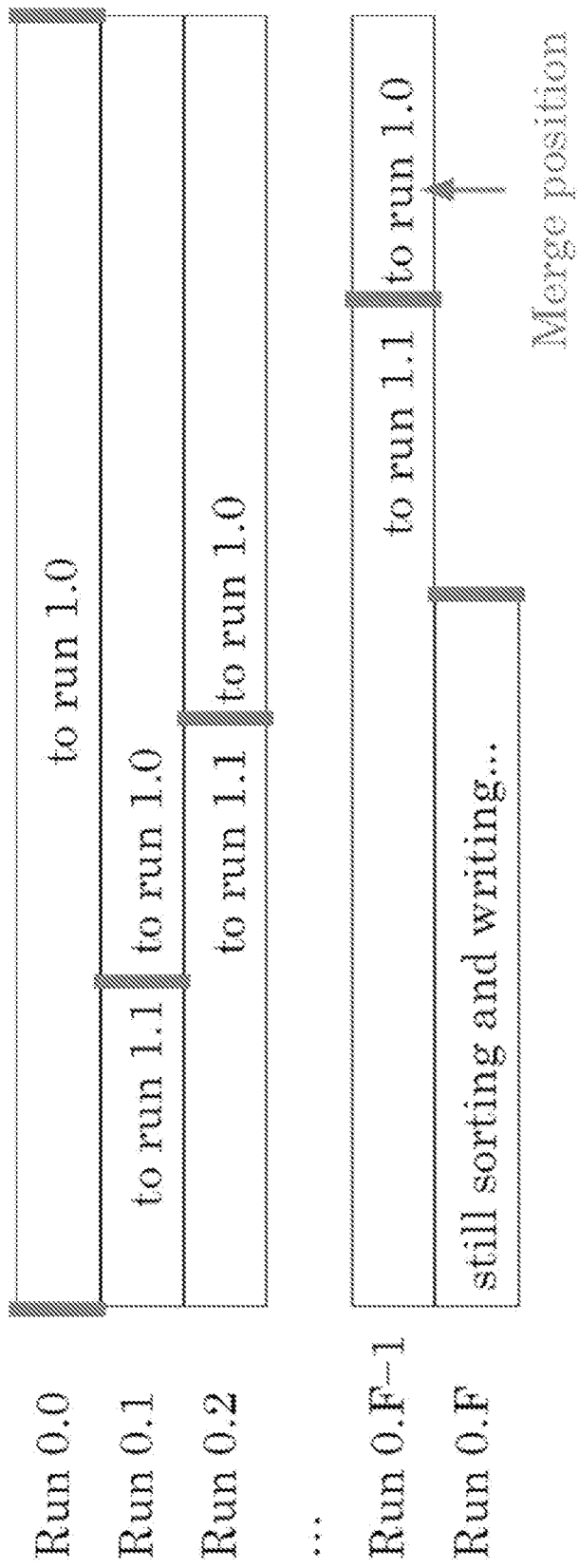
FIGS. 4A-4C show diagrams illustrating how merging commences immediately after run generation has completed its first run.
Figure 4B:
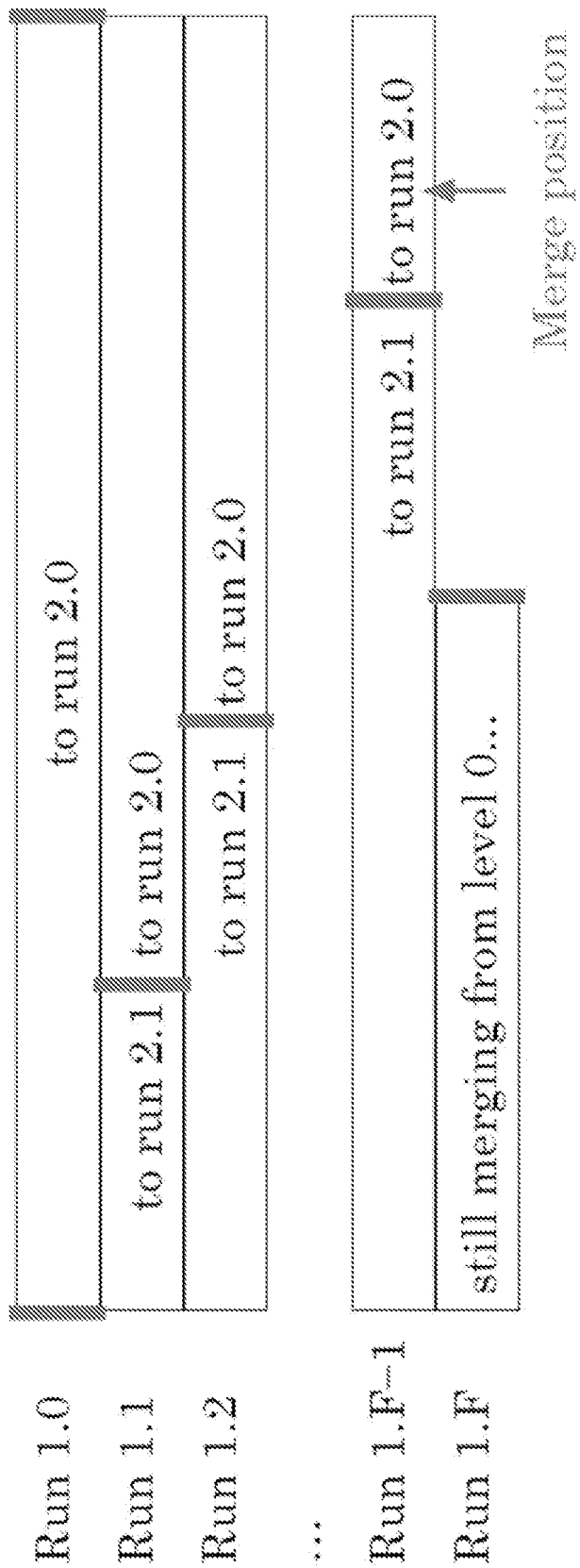
Figure 4C:
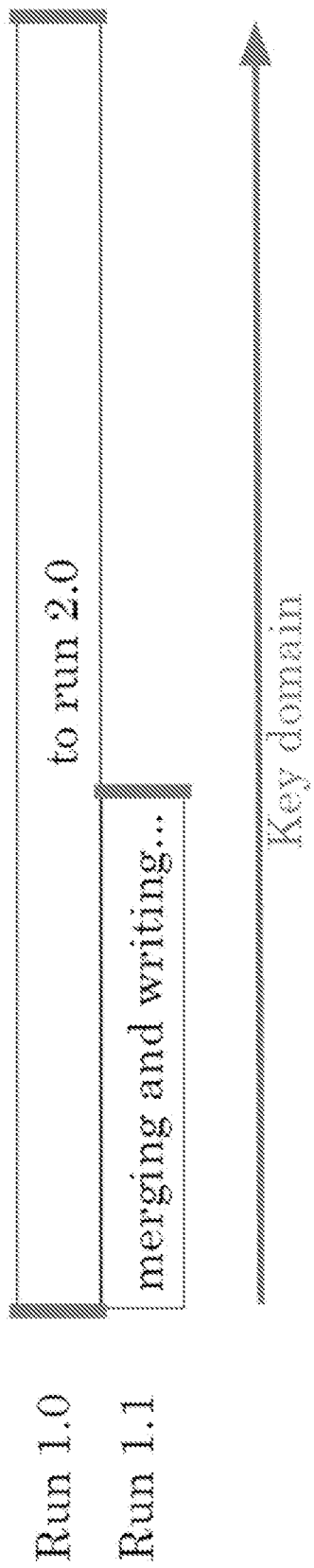

FIGS. 4A-4C show diagrams illustrating how merging commences immediately after run generation has completed its first run. Eventually, run 0 to F−1 from merge level 0 form run 0 on merge level 1. As merging starts with a trivial fan-in of 1, run 0 on merge level 1 will have few records in its lowest key range. When run generation completes the second run and the merge logic reaches the first switch-over key value, the trivial single-input merge becomes a real two-input (binary) merge. As run generation completes more runs and the merge logic reaches further switch-over key values, the merge fan-in grows to reach the full fan-in F. This fan-in is used from the last switch-over key value to the end of the merge step. The merge logic continues with full fan-in from level 0 to level 1 until all input is exhausted, for a streaming input indefinitely. When the merge logic reaches +∞ for the first time, it completes the first run on level 1 and the merge logic commences from level 1 to level 2.

The initial merge effort is less effective than a full F-way merge. However, other approaches to merge sort do not even start merging until run generation has completed F runs. When F runs are complete, the present staggered merge reaches full effectiveness with a full fan-in of F runs. It continues fully effective until end-of-input (forever for streams).

The initial switch-over key values can be any reasonable estimates of quantiles within the key domain and the distribution of key values in the unsorted input. Incremental adjustment of switch-over key values is possible with very moderate effort.

Shutdown of Each Merge Level

If the unsorted input stream is finite, the merge logic continues at each merge level until its input is all processed and all runs have been dropped from the merge logic and from temporary storage. One difficulty is in different choices of switch-over keys in different merge levels.

System State

The same switch-over key values pertain to all merge levels. In fact, the entire design for merging level-0 runs carries over to all levels merging level-i runs to form a level-i+1 run. In other words, as soon as the first merge completes its first output run, the next-level merge commences, albeit initially with a trivial merge fan-in. Thus, at each level, F completed runs exists and currently feed the merge logic and one further is currently being formed. There is always a top-level merge currently being initialized; once that merge reaches its steady state when it completes its first output run, initialization of the next merge level commences. The top-level merge (at any point in time) can run with less than the full fan-in F. All lower, intermediate merge levels can run with full fan-in, with balanced input sizes, and therefore with maximal efficiency and effectiveness.

The bandwidth at each merge level is the same as the bandwidth of run generation. Each merge level can process as many rows or pages (per unit of time) as run generation produces from its unsorted streaming input. The storage consumption grows exponentially (by a factor equal to the merge fan-in F) from level to level like the run sizes. The speed with which the merge logic progresses through the key domain slows down from level to level (also by factor F).

Figure 5:
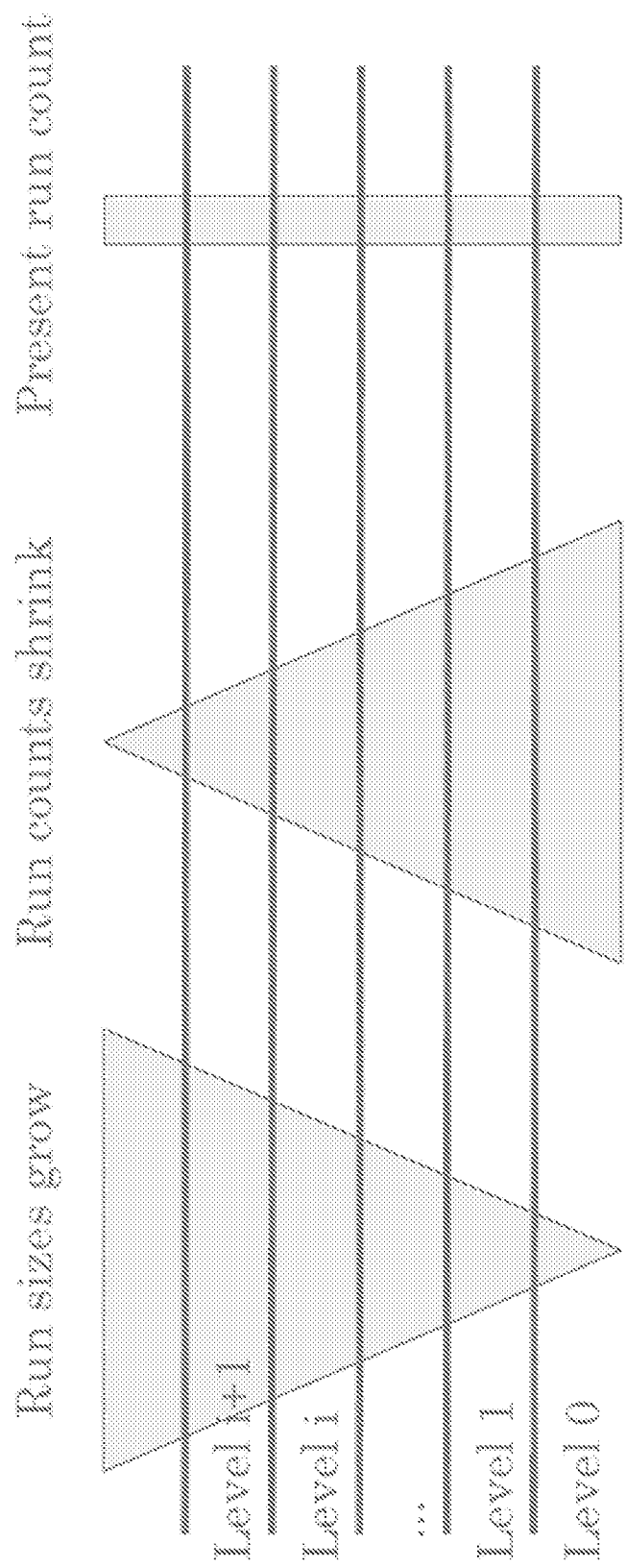
FIG. 5 is a diagram illustrating the variations in run sizes, run counts and present run count as a function of run levels.

FIG. 5 is a diagram illustrating the variations in run sizes, run counts and present run count as a function of run levels. The left part shows how the size of a run grows from one merge level to the next. Actually, these sizes grow exponentially, so a triangle is not precisely the right shape unless sizes are indicated on a logarithmic scale. The center part shows the count of runs created and merged at each level, across the entire sort activity. The right part shows the count of runs present at each level at any point in time. This number is constant across all merge levels at F+1 (F merge inputs, 1 output of run generation or a lower merge level), with the exception of the currently highest merge level, where the merge is still in its initialization phase. (Merge shutdown is not illustrated here).

At any point in time, the bulk of the data is in the top level or it is currently being merged and moved to that level. As soon as the first run is complete at a new level, there is as much data in that level of runs as in each prior level. This is also the time when merging commences at this level and this level becomes the new top level.

As a specific example, consider a single node in a highly parallel cluster absorbing input at 50 MB/s into initial runs of 1 GB and merging them with a fan-in of 10. After 6 merge levels, the merge logic has read and written each record 6 times, the run size will be 1 EB (per node), the total processing bandwidth (across run generation and all merge levels) will be 350 MB/s, the count of currently existing runs will be 66 (including one being formed at each merge level), and the count of runs searched in each query will be 60. Note that 1 EB/50 MB/s=20M sec≅7½ months.

Query Processing

Query processing can determine which runs to search and then search them efficiently. If each run is a b-tree or partition within a b-tree, searching within each run is easy. Among all existing runs, a query can search any run satisfying the following conditions: (1) the run is complete—there is no writer appending more data to this run, neither run generation nor merging; (2) the run is not yet completely merged into a run at the next merge level—a merge step is still reading the run; and (3) the current merge position is higher than the run's switch-over key value—there is no completed run at the next merge level that already holds the run's contents.

Figure 6:
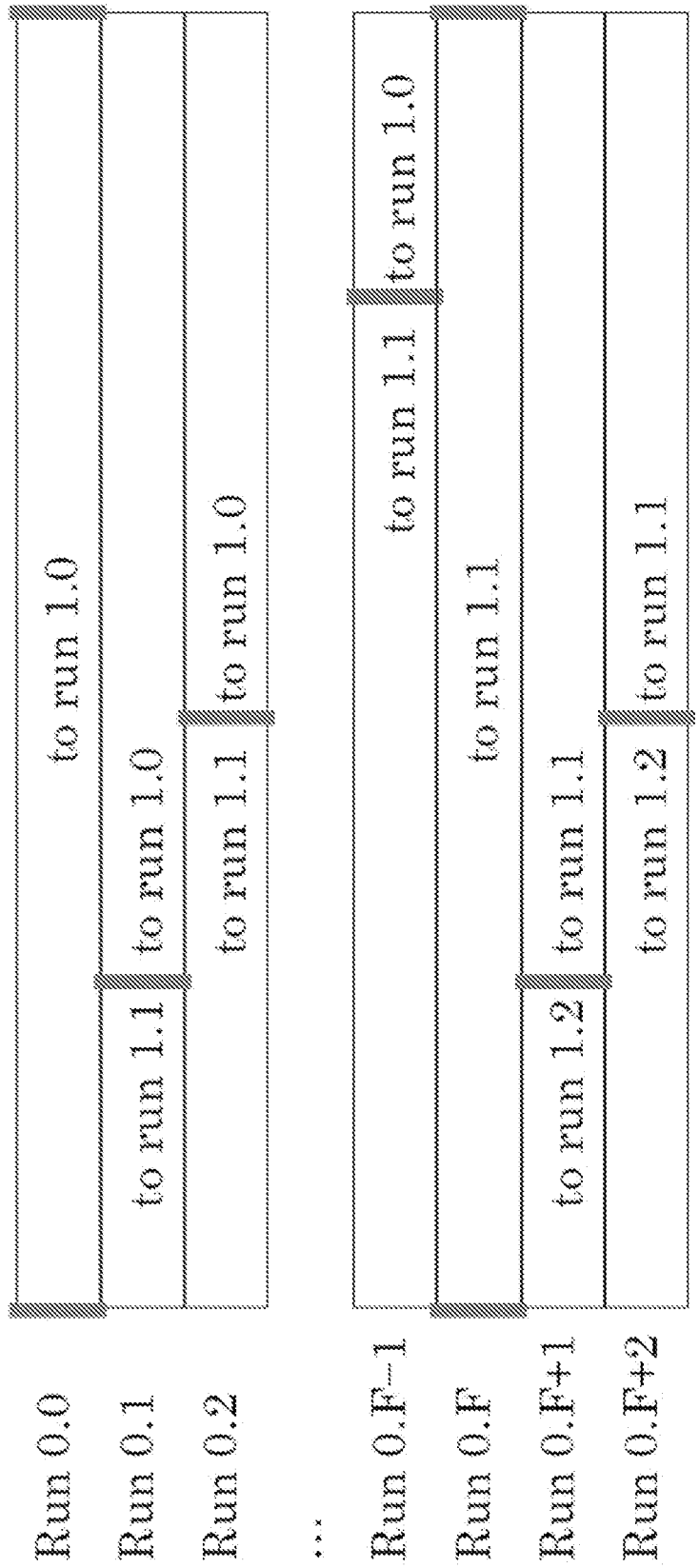
FIG. 6 shows a diagram illustrating query processing. A query can first inspect the recent, small runs.

FIG. 6 shows a diagram illustrating query processing. A query can first inspect the recent, small runs. If a query references a specific time range, some runs can be skipped. For a range query, it may be necessary to break the query predicate in two, namely if the run's switch-over key value falls within the query predicate. If sorted output is desired, the query execution plan will merge scan output from multiple b-trees (or partitions). Since each individual scan provides sorted key values, sorting may not be performed from scratch, not treating the union of all scan results as unsorted.

Summary of Staggered Merging

To summarize, staggered merging turns an unsorted input stream into an ordered index. It employs run generation and merging in the style of a log-structured merge-tree. Merging is efficient because it is balanced, such that, in each merge step, all input records have participated in the same number of earlier comparisons (except for rounding errors). The merge fan-in can be chosen for an optimal tradeoff between merge efficiency and the number of runs (b-trees, partitions) in existence at any time such as the runs that a query is to inspect.

At each merge level, the merge logic cycles continuously through the key domain. The defining characteristic is that different runs enter a merge step at different key values; each runs is merged through one full cycle over the entire key domain. The current top-level merge step incrementally increases its merge in; all lower merge steps always run with the chosen fan-in.

This merge policy minimizes the number of runs existing at any point of time. It also keeps this number steady at each merge levels as well as overall merge levels. The variants discussed below attempt to query higher-level runs even more aggressively than the design above.

Adjusting Switch-Over Key Values

Good choices for switch-over values are quantiles. However, the best current estimates of quantile key values can change over time. Thus, the set of switch-over key values can change. The text and diagram below focus on adjusting a single switch-over key value.

Figure 7:
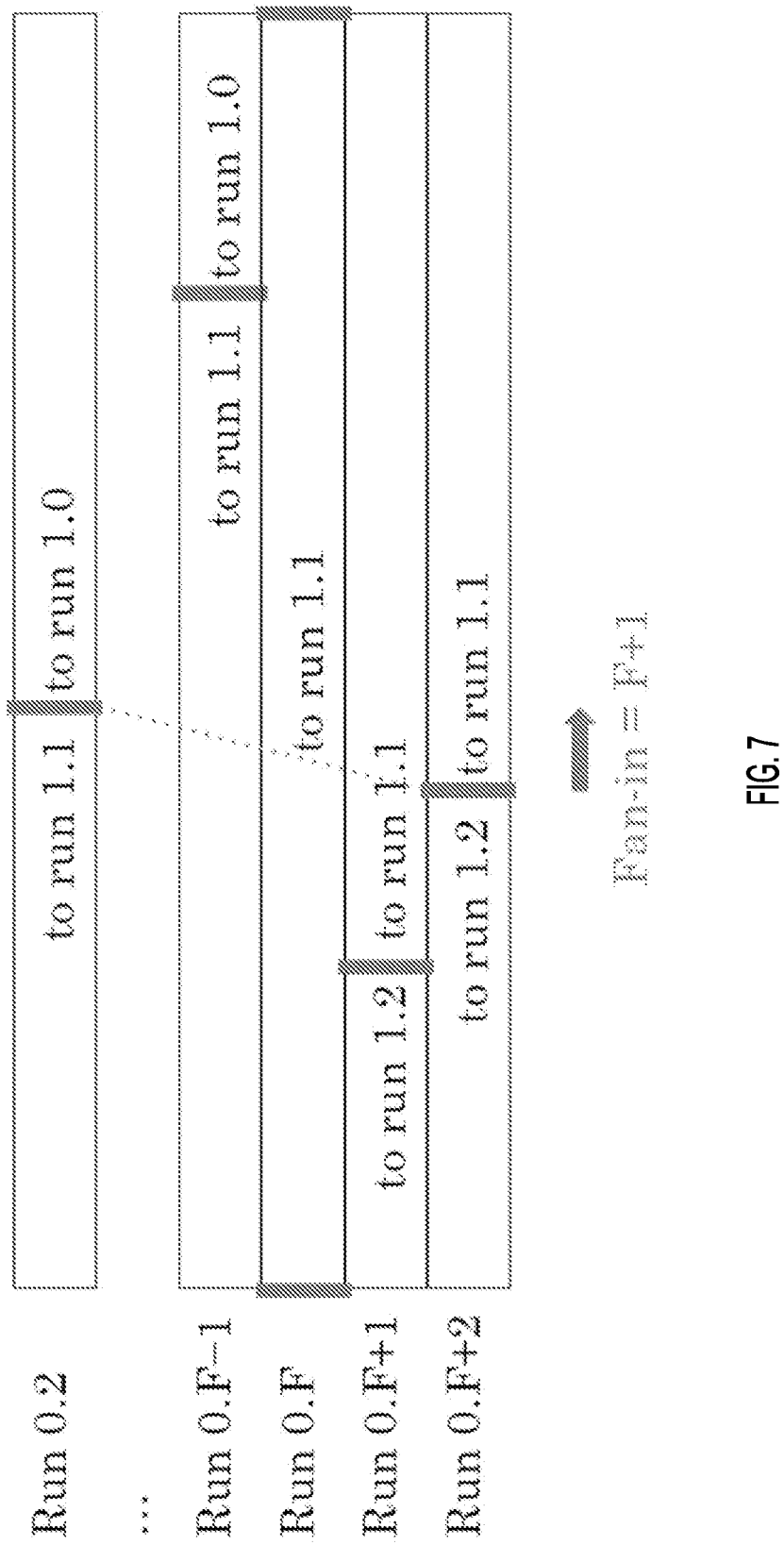
FIG. 7 shows a diagram illustrating how a switch-over key value can be replaced by a lower value.

FIG. 7 shows a diagram illustrating how a switch-over key value can be replaced by a lower value. Without such a change, the merge logic will add input run 0.F+2 immediately after dropping run 0.2. If a lower switch-over value is desired, the merge logic will add 0.F+2 somewhat earlier at a lower key value. Thus, the merge logic temporarily has more than F inputs. If incremental changes are sufficient, the merge logic can be limited to a maximal fan-in of F+1 when lowering a switch-over key value and to a minimal fan-in of F−1 when a higher switch-over key value is desired.

In summary, log-structured merge trees are ideally suited to combine high-bandwidth data intake and efficient query processing by indexing new information on multiple dimensions. On the other hand, other implementations involved occasional merge steps that impose a load on CPUs, buffer pool, and I/O devices, which in turn slows down query processing and may cause consternation among users due to unpredictable responsiveness.

Sorting and merging are most efficient if each merge step has balanced inputs. Continuous merging at each merge level achieves equal bandwidth in run generation and each merge level as well as fixed storage requirements for each level of runs. Merging at each level becomes a continuous process instead of the expected bursty behavior, somewhat reminiscent of the way run generation becomes a continuous process by relying on replacement selection (e.g., with a priority queue) instead of read-sort-write cycles (e.g., with quicksort). By avoiding load spikes and performance cliffs, the proposed merge strategy avoids the "waves of misery" in other approaches.

Log-structured merge-trees and stepped-merged-trees are forests of many b-trees that offer tradeoff choices favoring either high-bandwidth data ingestion or low-latency index search. Efficient merging of b-trees or partitions, i.e., few merge levels, demands the maximal fan-in; but efficient searching, i.e., few partitions at a time, demands the minimal fan-in, i.e., binary merge steps. This tension cannot be eliminated, but two techniques can change the relationship between merge fan-in and partition count in a query. In a typical situation, the merge fan-in improves by a factor of 2½ and the count of merge levels by a factor of 1½ while the search effort per query improves by a factor of almost 2. The proposed algorithms and storage structures are designed for use within each node of a cluster or a data center; they are orthogonal to partitioning, clusters, data centers, redundancy, and worldwide scaling.

B. Maintaining Key-Value Stores by Performing Staggered Merging

Following below are more detailed descriptions of various concepts related to, and implementations of, methods, apparatuses, and systems of staggered merging in Log-structured merge forests. The various concepts introduced above and discussed in greater detail below may be implemented in any of numerous ways, as the described concepts are not limited to any particular manner of implementation.

B-tree indexes have for decades been ubiquitous in databases, key-value stores, file systems, and information retrieval. They excel at random insertions and deletions, point and range queries, and mixed workloads. Moreover, they have excellent operational characteristics, including efficient index creation after sorting, efficient consistency checks, serializable fine-grain concurrency control by locking key values and gaps between them, and efficient query execution using sorted streams, e.g., in-stream aggregation and merge join after ordered scans. Indexing continuous, high-volume streams of data, e.g., logs and history tables, does not count as a strength, because even the smallest update or insertion requires reading and writing at least a leaf page (in most contexts). In other words, insertion-mostly applications suffer from write amplification equal to the blocking factor (records per page, e.g., hundreds). The count of reads (for updates) equals the count to writes (ignoring buffer effects, assuming indexes much larger than the available or allocated buffer pool).

INTRODUCTION

B-tree indexes may be used in databases, key-value stores, file systems, and information retrieval. They excel at random insertions and deletions, point and range queries, and mixed workloads. Moreover, they have excellent operational characteristics, including efficient index creation after sorting, efficient consistency checks, serializable fine-grain concurrency control by locking key values and gaps between them, and efficient query execution using sorted streams, e.g., in-stream aggregation and merge join after ordered scans. Indexing continuous, high-volume streams of data, e.g., logs and history tables, does not count as a strength, because even the smallest update or insertion requires reading and writing at least a leaf page (in most contexts). In other words, insertion-mostly applications suffer from write amplification equal to the blocking factor (records per page, e.g., hundreds). The count of reads (for updates) equals the count to writes (ignoring buffer effects, assuming indexes much larger than the available or allocated buffer pool).

Log-structured merge-trees as well as stepped-merge trees are designed specifically for indexing logs and history tables. They can employ large sequential reads and writes, write amplification equals the merge depth (e.g., about ten), and read counts equal write counts. Nonetheless, they support searching while merging, including the required concurrency control and recovery techniques. The research introducing log-structured merge-trees demonstrated that for their target applications, log-structured merge-trees are vastly superior to b-trees in resource efficiency and in data center costs.

This research has been motivated by a real application capturing, indexing, and querying log records. Concrete examples may include a database recovery log strictly sorted by time plus a log archive sorted and indexed by database page identifier in order to enable single-page repair as well as instant restart, instant restore, instant failover, self-repairing indexes, and more; or of a web service with many concurrent users in need of assembling and analyzing user sessions (sorting, indexing, and aggregating log records on user identifier).

The relevant characteristics of the example context are: an information capture process adds a sorted run every minute; each run contains a minute's worth of new entries for an ordered index; the index is a forest of b-trees with a b-tree per partition (or a partitioned b-tree); and queries search by key value up to one month back (28–31 days×24 hours). With an overall merge fan-in of 31×24×60=44,640, a single-level merge (e.g., once a month) is impractical and a two-level merge requires a fan-in of 212 (a merge step every 212 minutes≈3½ hours).

TABLE 1

Merge and search minutes within a month.

| Levels | Fan-in | Search |
|---|---|---|
| 2 | 212 | 636 |
| 3 | 36 | 162 |
| 4 | 15 | 90 |
| 5 | 9 | 68 |
| 6 | 6 | 54 |
| 7 | 5 | 53 |
| 8 | 4 | 48 |
| 10 | 3 | 45 |
| 16 | 2 | 48 |

Table 1 shows more calculations for this example. The fan-in column implicitly indicates the minutes between merging one-minute partitions. The terms delta, run, and partition are used interchangeably in this disclosure, as are the terms merging (of runs) and compaction (of deltas). There is a final merge once a month in all cases. The search effort indicates the average (expected) number of partitions each query is to search. It is the product of the merge levels, the required fan-in F, and a constant 1.5, which reflects that the number of partitions on each merge level oscillates in a saw tooth pattern between F and 2F. The choice for minimal merge effort (2 merge levels) implies a search cost (and thus query latency) 14 times higher than optimal (636 versus 45 partitions); the choice for minimal query latency requires five times more merge effort than optimal (10 versus 2 merge levels); and a balanced choice requires twice the optimal merge effort (4 versus 2 merge levels) and twice the optimal search effort (90 versus 45 partitions). A near-optimal choice for search latency still requires three times more merge effort than optimal (6 versus 2 merge levels). It is this case for which the abstract promises specific factors of improvement.

The goal of this research has been to improve on these choices, data structures and algorithms. For example, the storage structure may be a linear form of partitioned b-trees; the in-memory data structure may be an ordered index that manages both run generation and runs on storage; and the algorithm may be a staggered continuous merge logic that eliminates runs waiting to be merged and thus improves on external merge sort in some metrics important for log-structured merge-trees.

External Merge Sort

External merge sort has three phases: an input phase, also known as run generation; an output phase, also known as final merge; and if necessary some intermediate merge steps. Run generation is pipelined with the producer and the final merge is pipelined with the consumer. For example, a merge join might consume its input from two sort operations in their final merge and produce its join result into the run generation logic of another sort, perhaps in preparation of another merge join on a different join column.

Run generation may employ read-sort-write cycles, e.g., using quicksort, or continuous replacement selection, e.g., using a priority queue. Runs in generation by read-sort-write cycles are the size of the allocated memory. Run generation by replacement selection produces such runs in the worst case (reverse sorted inputs), twice that size in the expected case (random inputs), and much longer in better and best cases (nearly or fully pre-sorted inputs). A tree-of-losers priority queue enables replacement selection with the fewest comparisons. Key normalization, such as encoding an entire key value in an order-preserving binary string, reduces the cost per comparison. Offset-value coding, a form of prefix truncation, avoids many byte-string comparisons and reduces the byte count of the remaining ones. Hardware support can speed up both tree-of-losers priority queues and offset-value coding. Both normalized keys and offset-value coding carry from run generation via run files on temporary storage and merge steps to the sorted output and to query execution, e.g., in-stream aggregation or merge join.

An in-memory index can support both read-sort-write cycles and replacement selection. In addition to reordering input records, an in-memory index can also support aggregation, enabling sort-based grouping (duplicate removal and aggregation) as efficient as hash-based grouping. Incidentally, both types of algorithms benefit if the in-memory index supports multiple types of records, specifically groups-of-one optionally represented not by intermediate aggregation records but by input records. For example, for a query for minimum, maximum, and average over a table with a grouping key and one measure, an input record can represent a group-of-one more compactly than an intermediate record with minimum, maximum, sum, and count.

For minimal I/O for runs on temporary storage, external merge sort uses the maximal merge fan-in. The fan-in is limited by the buffer size, the page size, and buffering requirements for read-ahead and write-behind. In an approximation, the page size should equal (approximately) the product of latency and bandwidth of temporary storage. For example, if temporary storage uses disk drives, 10 ms×100 MB/s=1 MB may be a reasonable page size.

The principal design ideas of external merge sort can apply to any step in a memory hierarchy, not only to internal memory overflowing to external (temporary) storage but also to CPU caches overflowing to main memory or to flash storage overflowing to disk, for example. The transition from internal to external sort should be incremental, designed for graceful degradation and thus avoiding "performance cliffs." The same is true for the introduction of intermediate merge steps, such as the transition from an external merge sort with a single (final) merge step to one with multiple (intermediate) merge steps. Again, this consideration applies to all steps in a memory hierarchy.

Log-Structured Merge-Trees

In the words of the inventors of log-structured merge-trees, "The Log-Structured Merge-tree (LSM-tree) is a disk-based data structure designed to provide low-cost indexing for a file experiencing a high rate of record inserts (and deletes) over an extended period. The LSM-tree uses an algorithm that defers and batches index changes, cascading the changes from a memory-based component through one or more disk components in an efficient manner reminiscent of merge sort." Moreover, "the LSM-tree is most useful in applications where index inserts are more common than finds that retrieve the entries. This seems to be a common property for History tables and log files, for example." Beyond their specific examples, it is believed that the technique is applicable in any context that requires continuous information capture at high bandwidth and search queries over old and new (recent) data—in other words, any data warehouse, any analysis of web logs, any restart or restore operation based on write-ahead logging, and more.

Log-structured merge-trees employ partitions, often as individual b-trees, on permanent storage rather than sorted runs on temporary storage. Queries may search the partitions at any time. Moreover, log-structured merge-trees employ a merge pattern strikingly different from external merge sort. They repeatedly merge the memory contents with all existing data. In terms of the motivating example, they save data for the first minute, merge the second minute with the first minute, merge the third minute with the first two minutes, merge the fourth minute with the first three minutes, etc. Eventually, e.g., after half an hour, they leave that partition alone and start over with one, two, three, etc. minutes. After another half hour, they merge the second half hour with the first half hour, then merge the third half hour with the first hour, merge the fourth half hour with the first hour and a half, etc. Eventually, e.g., after a day, they leave that partition alone, etc. In other words, there are multiple merge levels as in external merge sort, but there are also merge steps within each level. Note that these merge steps are binary. They combine precisely two inputs, and often unbalanced, as they combine inputs of very different sizes.

Balanced merging, in contrast to this non-balanced merge pattern, may reduce the merge effort but it increases the search effort. In a balanced merge pattern, if each merge step with fan-in F begins when there are F input runs complete and finishes when another F input runs are ready for the next merge step on the same level, then the number of runs (partitions) searched by each query repeatedly grows from F to 2F. On average, each query searches 1.5F partitions, as used in the calculations for Table 1 in the Introduction. The tradeoff or policy decision that sets the merge fan-in F favors either merge or search: a small fan-in favors efficient searching, a large fan-in favors efficient merging. (The assumption here is that moving data from and to temporary storage or within memory is the dominant effort and cost in a merge, and that the cost of key comparisons is negligible in this optimization.) Binary merging minimizes the number of runs in existence at any point in time of partitions searched by each query, but maximizes the merge effort (among all balanced merge strategies). The maximal fan-in minimizes the merge effort by minimizing the number of merge levels, but it maximizes the query effort.

The original design of log-structured merge-trees employs two additional techniques. First, logical updates map to physical insertion of replacement records, logical deletions map to physical insertion of "tombstone" records, and the logic in merge steps and in query execution aggregates the correct up-to-date contents. Second, "range deletion" employs a single record of a special type for logical deletion of an entire key range, even if this method of bulk deletion does not provide any immediate feedback about the number of deleted records, if any.

Partitioned B-Trees and Adaptive Merging

A partitioned b-tree is a single b-tree that contains, in effect, many b-trees. An artificial leading key field in each index entry holds partition identifiers. Prefix truncation practically avoids any additional storage requirements and comparison overheads. Creation and removal of a partition can entail key insertion and deletion, but no catalog transaction or file system update. The search logic in a partitioned b-tree equals that of Tandem's multi-dimensional access method for b-trees. A search is to enumerate the partition identifiers that currently exist and search each partition. With consecutive partition identifiers, a search for a key value requires one root-to-leaf search per partition.

An in-memory partition absorbs small transactions including insertion of replacement and tombstone records. Records overflow to storage by incremental spilling similar to run generation with replacement selection. Merging partitions may require append-only access to a specific partition, which is an insertion except in the last partition of a partitioned b-tree.

A partitioned b-tree can enable adaptive merging, which is "merge sort on a funny schedule," or merging a query predicate's entire key range as a side effect of query execution, inasmuch as database cracking is "quicksort on a funny schedule," splitting one or two existing partitions in each range query. Adaptive merging requires more effort than database cracking in the first query (run generation, not just copying key values) and in each query until the index is fully optimized (into a single partition), but it enables much faster index optimization (fewer queries) with similar total effort (about $N \log_2 N$ comparisons) and it is not limited to in-memory arrays and in-memory databases.

Partitioned b-trees may employ a few additional techniques. First, large insertions (load operations) may go directly to a new partition or even multiple new partitions such that a load operation may entail run generation logic but no merge logic. Second, redundant storage structures, e.g., secondary indexes and materialized (indexed) views, may fall out-of-date, with new index entries propagated during a merge step in the primary storage structure. Such deferred maintenance still permits index-only retrieval but it is to check recent partitions in the primary storage structure. Third, spilling from the in-memory partition to persistent storage may optionally retain "popular" index entries. This is particularly useful in sort-based grouping (duplicate removal and aggregation). In a recovery log for write-ahead logging, grouping and aggregation means log compression by computing the "net change" across multiple original log records; retaining popular index entries means log compression focused on database hot spots. Fourth, after an expensive search across multiple partitions, the latest record may be re-inserted as replacement record into the in-memory partition. In applications and queries with temporal locality, this LRU-like logic may enable significant savings. Fifth, a request for "insertion if not present" may involve an index search. Instead, insertion of a special "insert if not present" index entry delays the decision from update to query execution, avoids the search during the insertion, and performs the check practically for free as part of the merge logic. It does not, however, indicate immediately whether the key value already existed. Sixth, insertion of an "insert or update if present" index entry may also avoid a search during an insertion.

Summary of Other Approaches in Relation to B-Trees

Log-structured merge-trees define indexing streams, continuous high-bandwidth insertions with concurrent low-latency queries. They may require a compromise between these two goals. Partitioned b-trees are a possible representation or storage structure for log-structured merge-trees. Adaptive merging combines merging and query execution, with merging a side effect of query execution. The next two sections introduce variants of partitioned b-trees and of merging in log-structured merge-trees.

Linear Partitioned B-Trees

As a data structure, a linear partitioned b-tree is both b-tree and linked list, or in fact many linked lists. There can be one in-memory partition organized as a b-tree (or something equivalent, e.g., a 2-3-tree). On-storage partitions may have leaf nodes but no branch nodes (parent, grandparent, ancestor nodes). Instead, leaf nodes may hold multiple types of data records, one of which are key-pointer pairs, and each partition j can include as data records in its leaves the parent entries (key-pointer pairs) of partition j−1, with the in-memory partition holding key-pointer pairs for the most recent on-storage partition. Even if all on-storage partitions lack branch nodes and thus do not really look like trees, their data pages will still be called leaf nodes. Each leaf node x in an on-storage partition j holds not only parent entries for partition j−1 but also a pointer to the leaf node in partition j−1 that corresponds to the lowest key value in leaf node x.

Since leaf nodes in linear partitioned b-trees supports at least two record types and a shared sort order for them, they seem ideal for merged b-trees. In order to cluster components of complex objects, a merged b-tree combines multiple, single-table indexes based on their common attributes and thus on a common sort order. With suitable key structures, single-table indexes may be added and removed at will. For efficient removal of one index among many, a "range deletion" record might be useful designed to affect only one record type.

The storage requirements of linear partitioned b-trees equal those of b-trees because they have the same parent entries, albeit in different places; and the grandparent and further ancestor levels of b-trees are missing in linear partitioned b-trees, which have a few additional parent and grandparent entries because the parent entries in the leaf level extend the leaf level and thus may require a few more ancestor nodes.

Search and Merge in Linear Partitioned B-Trees

An exact-match (equality) query performs a root-to-leaf b-tree search within the in-memory partition and then accesses the correct pages within earlier partitions like a linked list. In this search, the query accesses data pages that contain the key value of interest or would contain it if the key value were present. By avoiding the repeated root-to-leaf searches, a query in a linear partitioned b-tree is more efficient than in a partitioned b-tree. A range query scans within each partition, with the scan in partition j−1 guided by the pointers found in partition j.

A merge step combines adjacent partitions immediately preceding the in-memory partition. The merge logic deletes the key-pointer pairs in memory for the merge input and inserts key-pointer pairs for the merge output. In the merge output, the merge logic suppresses key-pointer pairs to other merge inputs but preserves the key-pointer pairs referencing the partition immediately preceding the merge inputs.

Note that this data structure readily supports a multi-level external merge sort. At any point in time, the in-memory partition serves run generation. Each time when the appropriate number of level-0 runs exist (immediately preceding the in-memory partition), they are merged and replaced by a level-1 run. Similarly, each time when the right number of level-1 runs exist, they are merged and replaced by a level-2 run. Note that there is a point in time when these level-1 runs immediately precede the in-memory partition—that is the time to merge them. The same logic applies to additional merge levels.

Variations of Linear Partitioned B-Trees

A linear partitioned b-tree supports equality search and range scan with sorted results. The equality search traverses the in-memory partition from root to leaf followed by linked-list traversals in the on-storage partitions. The range scan starts with a search for the low key value and then merges all partitions guided by the key-pointer pairs embedded in the in-memory index and the partitions. There are some variations in data structure and algorithm that may be useful in some situations or applications.

First, the on-storage structure may include both the b-tree branch nodes and the linked list. This can be useful in a search for a rare search key that occurs only in a small fraction of partitions. For example, if a key value occurs only in 5% of all partitions, it may be more efficient in terms of I/O, even if not in terms of CPU effort, to perform a few root-to-leaf traversals than to follow 20 times more partition-to-partition pointers. An estimate of the number of partitions that is to be searched as well as a conservative estimate of the specific partitions may be computed using a bit vector filter, also known as Bloom filter. The redundant parent entries (both in the parent nodes and in the leaf nodes of the next partition) moderately increase the storage requirements compared to b-trees and the default design of linear partitioned b-trees. This variant makes linear partitioned b-trees somewhat similar to Tokutek's index trees.

Second, very large partitions may require very many parent entries, perhaps creating space contention for the in-memory partition. In that case, the very large partition may have parent nodes (immediately above the leaf nodes) but no grandparent or further ancestor nodes; key-pointer pairs in the in-memory partition then reference parent nodes, not leaf nodes, in the preceding partition. More extreme variants are conceivable, e.g., if each run is a b-tree, the next partition may contain only the key-pointer pairs of the root, keeping all other b-tree levels with the leaves, e.g., with the data pages. Using this technique, it seems easily possible to limit the key-pointer pairs in the next partition to perhaps 100 or 1,000, even for extremely large partitions. Note that this variant does not affect storage requirements, it moves requirements from a subsequent partition to the data partition.

Third, instead of linked lists through all partitions, the in-memory partition may hold key-pointer pairs from multiple partitions, e.g., a few partitions carefully selected by their age or creation time. These partitions may also have key-pointer pairs in subsequent on-storage partitions or the key-pointer pairs in the in-memory partition may be the only available access path. Again, this variant does not modify the overall space requirement, but it does move space requirements from successor partitions to the in-memory partition.

Finally, each key-pointer pair may have a zone filter attached. The included bit vector filter, minimum and maximum values, and optional second-to-minimum and second-to-maximum values summarize data in the next partition. The do not summarize all subsequent partitions. Thus, they can save the search for data values but not for the search for key-pointer pairs.

Summary of Linear Partitioned B-Trees

In summary, linear partitioned b-trees can be searched by a single in-memory root-to-leaf traversal followed by linked-list traversal. There are multiple variations; in addition, any combination of these variations is possible, e.g., the in-memory partition holds key-pointer pairs for leaves and branch nodes in multiple partitions.

A final remark: whereas a partitioned b-tree is a single, b-tree with an artificial leading key field in each key value, a linear partitioned b-tree has on-storage components that may not really be b-trees at all but simply sorted runs, and they may form a single file in the file system or there may be multiple individual files. In other words, a linear partitioned b-tree can use any on-storage file format that permits direct access to pages.

Staggered Merging

The merge process is continuous, with no sudden starts and stops of merge steps. Runs may enter and exit a merge step at key values other than −∞ and +∞. In other merge logic, each merge input run contributes to exactly one merge output run, whereas in staggered merging, each merge input run contributes to two merge outputs runs in most instances.

In order to start merging an input run at a particular key value, an efficient search within a run is required. A b-tree offers the capability with little extra cost during run creation. There are multiple ways to organize runs into b-trees. A linear partitioned b-tree offers an attractive choice.

The in-memory ordered index, possibly a b-tree, holds data records as well as key-pointer pairs for on-storage partitions. The on-storage partitions may not have branch nodes of their own; in other words, they may be flat sorted files of any format. Runs (partitions) are organized in levels; the runs of each merge level form linked lists and the anchors of these linked lists, of each merge level, are in the in-memory index.

A query searches the in-memory index and traverses linked lists, starting with the most recent partitions. A merge step modifies the in-memory index as described in the sub-sections below. Discussion of incremental release of temporary storage is delayed issue to the "Storage Space Reclamation" section.

Figure 8:
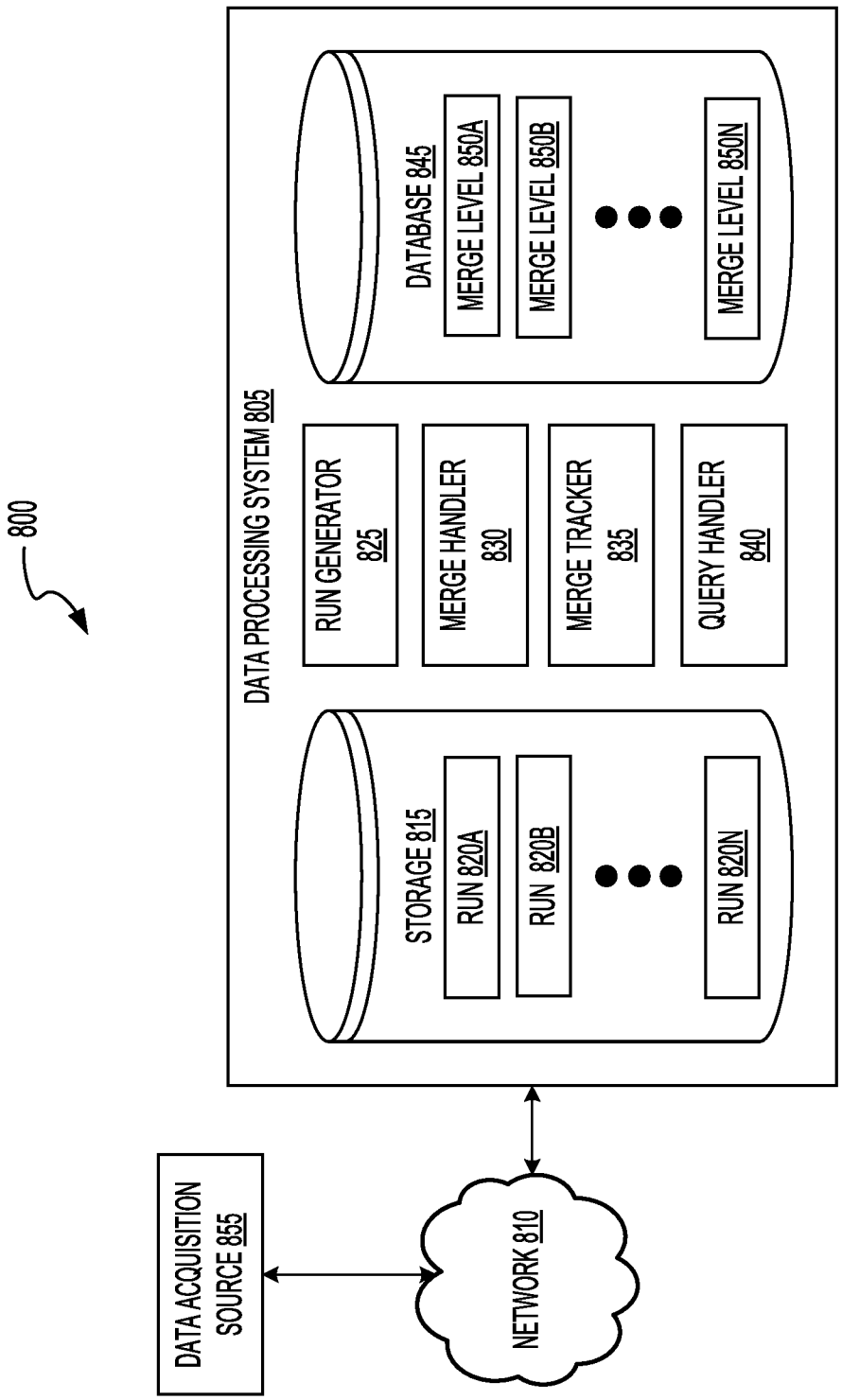
FIG. 8 shows a block diagram depicting an example environment for maintaining key-value stores by performing staggered merging.

Referring now to FIG. 8, depicted is a system or an environment 800 to maintain key-value stores by performing staggered merge. The environment 800 can include at least one computer network 810. The network 810 can be a computer network, which can include one or more local area networks, a wide area network, private networks, public networks, and the Internet. The environment 800 can include at least one data acquisition source 855. The environment 800 can include at least one data processing system 805. The data processing system 805 can include at least one storage medium 815. The storage 815 may comprise any computer-readable storage media. The data processing system 805 can include at least one run generator 825, at least one merge handler 830, at least one merge tracker 835, and at least one query handler 840. The data processing system 805 can include at least one database 845. In some implementations, the data processing system 805 can include the data acquisition source 855. In some implementations, the storage 815 and the database 845 can be part of the same data storage on the data processing system 805.

Figure 12:
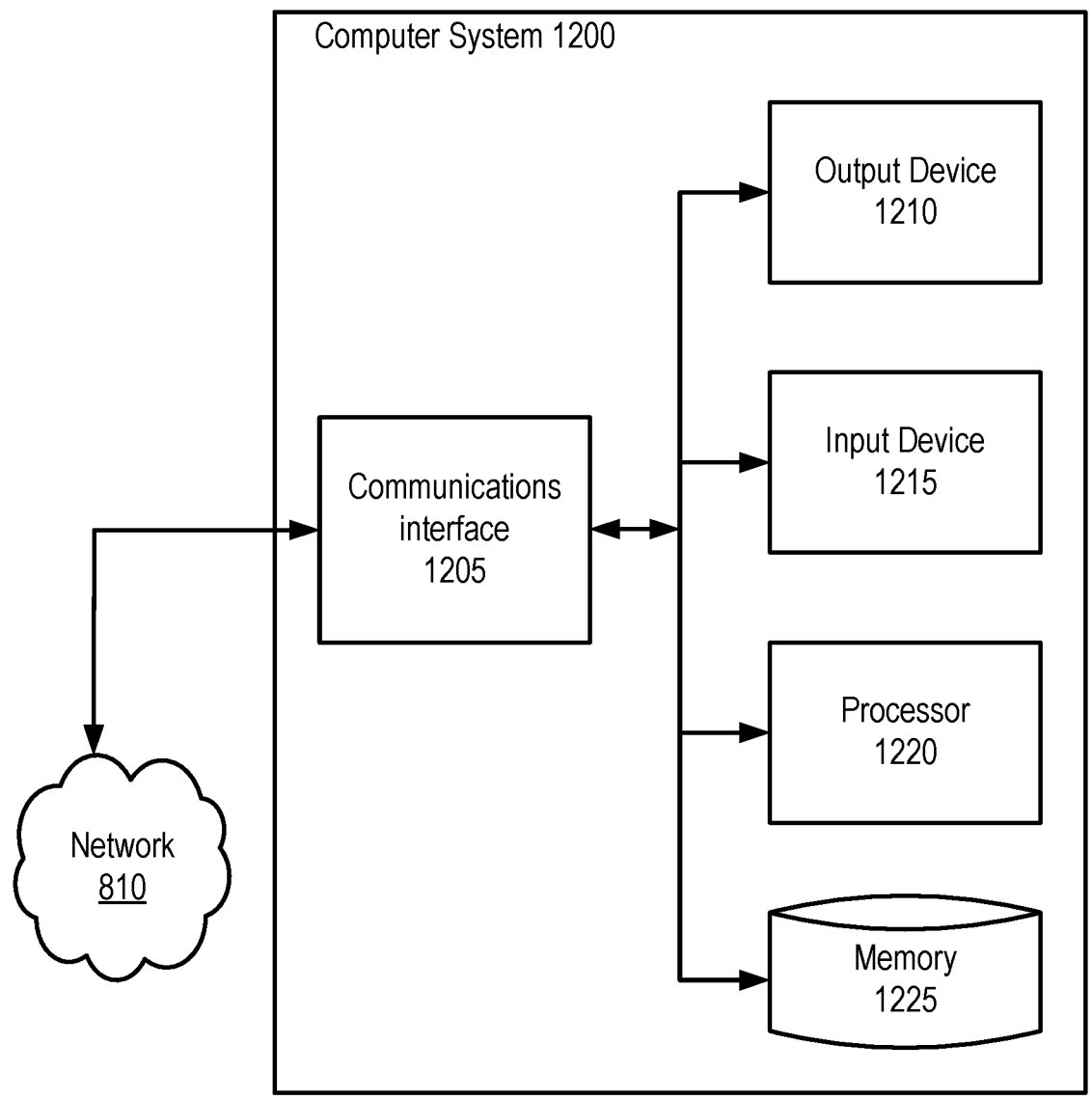
FIG. 12 shows the general architecture of an illustrative computer system that may be employed to implement any of the computers discussed herein.

Each of the components (e.g., the network 810, the storage 815, the run generator 825, the merge handler 830, the merge tracker 835, the query handler 840, and the database 845 of the data processing system 805, and the data acquisition source 855) of the system 800 can be implemented using the components of a computing system 1200 detailed herein in conjunction with FIG. 12. For example, the data processing system 805 can include servers or other computing devices. The data acquisition source 855 can also include servers or other computing devices. Each of the components of the data processing system 805 can perform the functionalities detailed herein in conjunction with Sections A and B.

The data acquisition source 855 can acquire, receive, or identify data records (sometimes herein generally referred to as records). Each data record can include at least one key value (sometimes herein generally referred to as a value). The key value can include a set of alphanumeric characters (e.g., characters or a string) or a number (e.g., double, integer, and floating value). The key value may be defined to be within a key domain. The key domain for the key values of the data records can define a range of key values for the records. In some implementations, the key domain can have a minimum key value and a maximum key value, with the key domain including key values between the minimum key value and the maximum key value. For example, the key domain can be a range of temperatures (e.g., −150° C. to 1500° C.) that can be read by sensor measuring heat on an aircraft.

Each data record acquired by the data acquisition source 855 can also include an index value (e.g., time or sequence number) corresponding to an order of the creation of the data record. The index value may differ from the key domain defining the key values. In some implementations, the index value may correspond to a time of the receipt of the data record by the data acquisition source 855. The data acquisition source 855 can generate and associate a time index to each data record. The data records can be, for example, a structured template, a region of memory in a computer system populated by certain values, or a data structure such as a class or C-like structure. In some implementations, the data acquisition source 855 can generate data records including one or more key values. For example, the data acquisition source 855 can be a computing system coupled with a sensor in an airplane that can measure and sample temperature values at certain time intervals. In this example, the data acquisition source 855 can generate a data record that includes a key value based on the temperature reading of the sensor and a key value that is based on the current time value of the data acquisition source.

The data acquisition source 855 can transmit the data records to the data processing system 805 via the network 810 for maintaining the data records. In some implementations, the data acquisition source 855 can transmit the data records in a continuous stream. In some implementations, the data acquisition source 855 can provide the data records on a regular interval of times (e.g., one data record every ten milliseconds). In some implementations, the data acquisition source 855 can transmit data records on a variable time interval schedule. In some implementations, the data acquisition source 855 can transmit data directly to the data processing system 805 via a communication interface. In some implementations, the data acquisition source 855 can provide data records based on a schedule that is independent from time.

The run generator 825 executing on the data processing system 805 can receive the data records from the data acquisition source 855 via the network 810. With receipt of the data records, the run generator 825 can store and maintain the data records on the storage 815. The run generator 825 can access the storage 815 of the data processing system 805 to arrange, store, or write the received data records to one or more buffers. Each buffer can correspond to an allocated region of memory in on the storage 815. Each buffer can contain one or more of the data records received by the run generator 825 from data acquisition source 855. In some implementations, each buffer may be stored and maintained on a different storage 815. In some implementations, each buffer may be stored and maintained on the same storage 815. In preparation of sorting, the run generator 825 can write or store the data records onto the buffer in sequence based on the order of receipt from the data acquisition source 855.

Using the records stored on the storage 815, the run generator 825 can establish at least one run 820A-N (hereinafter generally referred to as run 820) (sometimes herein referred to as a partition or a delta). To establish the run 820, the run generator 825 can access at least one of the buffers maintained on the storage 815. In some implementations, the run generator 825 can access at least one of the merge levels 850A-N maintained on the database 845. Details of the maintenance of the merge levels 850A-N on the database 845 are provided herein below. The set of records in the buffer in the storage 815 (or the database 845) can initially be arranged or indexed by the index value (e.g., time stamp or sequence), and may be unsorted over the key domain. For example, the data records received by the run generator 825 may correspond to interactions on a content item across a multitude of clients. The data records can contain two key values: one corresponding to the time of the interaction, and another identifying to the content item. The run generator 825 may initially store the data records in the buffer on the storage 815 in the order of the receipt. To prepare the records for staggered merge, the run generator 825 can sort the data records by the content item index.

In establishing the run 820, the run generator 825 can perform a sorting algorithm to rearrange and sort the records of the buffer for the run 820. The sorting algorithm used to establish the run 820 can include a quick sort, a priority queue, a merge sort, a heap sort, an insertion sort, a bubble sort, a binary tree sort, a radix sort, and a bucket sort, among others. To perform the sorting algorithm, the run generator 825 can identify or establish the key domain over which it may sort the data records into runs 820 on the storage 815. As discussed above, the key domain can define the range of key values for the records. In addition, the run generator 825 can identify the key value of each data record in the buffer of the storage 815. Using the key values of the data records in the buffer, the run generator 825 can perform the sorting algorithm to rearrange the data records. With the completion of the sort, the run generator 825 can establish the records of the buffer in the storage 815 as the run 820.

The runs 820 established by the run generator 825 can be in accordance with a data structure for maintaining sorted records. For example, the run 820 may be a b-tree or a variant of a b-tree as described herein. In this example, the run generator 825 can generate the sorted data structure from the records, for example a b-tree or a variant of a b-tree. The run generator 825 can store the run 820 into a buffer designated for the run 820 in the storage 815. The runs 820 can be a sorted plurality of records that each contain a key value of a key domain. The runs 820 can each occupy a buffer, or region of memory, in storage 815. The region of memory can be established by the run generator 825, or any other module of the data processing system 805. In some implementations, the runs 820 are each sorted b-trees indexed by the key value of the key domain. In some implementations, the runs 820 are a different type of sorted data structure, indexed or sorted by the key value of the key domain. In some implementations, each run 820 occupies a discrete region of memory, or buffer, in the storage 815. In some implementations, all of the runs 820 occupy a single region of memory, or buffer, in the storage 815. In some implementations, each of the runs 820 can be sorted in ascending order by key value (e.g., by increasing numeric value or in alphabetical order). In some implementations, each of the runs 820 can be sorted in descending order by key value (e.g., by decreasing numeric value or in opposite of alphabetical order).

With the establishment of the runs 820, the merge handler 830 executing on the data processing system 805 can perform merging of one or more of the runs 820 to at least one merge level 850A-N (hereinafter generally referred to as merge level 850) on the database 845. In some implementations, the merge of one or more runs 820 onto one merge level 850 can be performed while performing sorting algorithm, such as those discussed above. The sorting algorithm can include, for example, a merge sort, such as an external merge sort. Based on the number of runs 820 to be merged, the merge handler 830 can perform an n-way merge using n of the runs 820 maintained on buffers of the storage 815 to produce one of the merge levels 850. Each of the merge levels 850 include records from a previous merge level 850. Upon a completion of the merge, the merge level 850 can include a run of sorted data records from the previous merge level 850. For example, a run on merge level 850B is generated from a merge of two or more runs from the first merge level 850A. The merge handler 830 can perform merges concurrently across any of the merge levels 850. The merge handler 830 can also merge one or more runs 820 into a merge level 850 in database 845. For example, the merge handler 830 can merge the first run 820A and the second run 820B into a run on merge level 850A.

The database 845 can be a database configured to store one or more merge levels 850 that are indexed by the key value. In some implementations, the database 845 is internal to the data processing system 805, and may be part of the storage 815 or vice-versa. In some implementations, the database 845 may exist external to the data processing system 805, and may be accessed via the network 810. In some implementations, the database 845 may be distributed across many different computer systems or storage elements, and may be accessed via the network 810 and/or a suitable computer bus interface. The merge levels 850 can be made up of data runs similar to the data runs 820 on the storage 815. In some implementations, the number of runs on a merge level is less than the number of runs on the merge level preceding it. For example, if merge level 850B is made up of 4 runs, merge level 850A can be made up of greater than 4 runs.

To perform the merge, the merge handler 830 can access the data records from one or more runs 820. In some implementations, the records accessed by the merge handler 830 can include records in one or more runs 820 from a previous merge level 850. The merge handler 830 can add data records from different runs 820 into a run on a merge level 850. For a level-0 merge, the data records from different runs 820 may be merged from storage 815 into the first merge level 850A on the database 845. In another example, the first run 820A and the second run 820B on the first merge level 850A can be merged into a first run 820A on the second merge level 850B. The data records can be merged using a merge sort algorithm, such that the data records in the resulting first run 820A of the second merge level 850B are stored in a sorted order based on a key value in the key domain. The merge handler 830 can also perform a 1-way merge, where the sorted records of a single run 820 are merged into a run 820 on the next merge level. For example, in the event that merge level 850A has only a single run 820A, the merge handler 830 can merge the first run 820A on merge level 850A into the first run 820A on the second merge level 850B.

In some implementations, the merge handler 830 can add multiple runs 820 onto the same merge level 850. For example, the merge handler 830 can begin merging runs 820A and 820B into a run on the merge level 850A. In the middle of the merge, the merge handler 830 can add run 830C, turning what was a two-way merge into a three-way merge, all into the same run on merge level 850A. The merge handler 830 can merge one or more runs using a merging algorithm, for example merge sort or external merge sort. In some embodiments, runs 820 are stored as sorted b-trees on storage 815. In this example, the merge handler 830 can use the external merge sort algorithm to combine runs 820A and 820B into a single sorted b-tree run on merge level 850A. Although the present disclosure has described runs being merge in order (e.g., 820A and 820B onto merge level 850A), the merge handler 830 merges can occur from any order or permutation of runs and the resulting operation may be stored on any merge level of the database 845, in any region of memory on storage 815.

As the merge of at least one run 820 is performed, the merge tracker 835 executing on the data processing system 805 can track the progress of each merge performed by the merge handler 830 on the merge level 850 using a merge index for the merge level 850. The merge index can reference the key values of the current data record accessed by the merge handler 830 to determine the progress of the merge operation in relation to the key domain. In some implementations, the merge tracker 835 can maintain a counter to keep track of the merge that increments for each key value added in the merge operation by the merge handler 830. The merge tracker 835 can track the merges between one or more runs 820 onto the merge level 850. The merge tracker 835 can also track merges between any of the runs on any of the merge levels 850. For example, the merge tracker can track the merge between runs 820A and 820B into a corresponding run of merge level 850A with a first associated merge index. The merge tracker can concurrently track a merge between one or more runs on merge level 850A into a corresponding run of merge level 850B with a second associated merge index, and so on.

While the merge is performed by the merge handler 830 and tracked by the merge tracker 835, the run generator 825 can concurrently establish another run 820 in the storage 815. For example, the merge handler 830 may begin merging the first run 820A and second run 820B into a on the first merge level 850A in database 845, while establishing a third run 820C using newly incoming records. The merge can be tracked using the merge index by merge tracker 835. Additionally, the merge handler 830 may be performing merges across other merge levels 850, while each merge is tracked with a respective merge index by merge tracker 835. While these concurrent merges occur, the run generator 825 can also concurrently receive data records and generate a new run in a buffer in storage 815, in this example run 820C.

Analogous to the merge tracker 835 using a merge index to track the progress of a merge operation of each run 820, the run generator 825 can track the progress of the establishment of a run 820 using a run index. The run generator 825 may also determine the run index based on the key value of the current data record in relation to the key domain. For example, the first run 820A can have a predetermined size established or received by the run generator. The run generator 825 can receive data records from the data acquisition source 855 for each data record, and update the run index to reflect the progress of the establishment of the run. The run index can be used to determine how many data records are present in a run. The run index can also be used to determine conditions under which a merge operation can occur in a similar manner as the merge index.

The merge tracker 835 can determine whether the merge index for the run 820 satisfies one of a set of quantile conditions (sometimes herein after referred to as a quantile, a merge condition, or a switch condition) for the merge level 850. Each quantile condition can specify a corresponding value for the merge index tracking the merging of one run 820 to the merge level 850 at which to trigger the addition of records from another run 820 onto the same merge level 850. In some implementations, the set of quantile conditions can be defined over the key domain. Each quantile condition can be set or defined to divide the key domain to evenly distribute the number of records in the run 820. For example, if the key domain were a range of temperatures ranging from −200° C. to 2000° C., the set of quantile conditions can be defined at even intervals within the key domain at −100° C., 0° C., 100° C., and so forth. In some implementations, each condition can be set or defined to divide the key domain in any other distribution. The quantile condition can also specify, indicate, or correspond to the number of records of one run 820 merged into the merge level 850 to trigger the addition of records from another run 820. In some implementations, the set of quantile conditions can be defined based on the number of records in each run 820. The set of quantile conditions can be defined to evenly divide the number of records in each run 820. For example, if there are a 100 records in each run 820, the set of quantile conditions can be merge index values of 25, 50, 75, and 100. The set of quantile conditions can also be defined to divide the number of records in each run 820 in any other distribution. In some implementations, the quantile condition may be predetermined or fixed prior to the establishment of the runs 820 or the performance of the merge. In some implementations, the quantile condition may be dynamically determined.

In some implementations, the merge tracker 835 can determine the quantile condition to which to compare the merge index or the run index against using any number of factors. In some implementations, the merge tracker 835 can determine the quantile condition by determining a switch over key-value. The switch-over key value can be the key value that causes the merge index to satisfy the quantile condition. In some implementations, the merge index satisfies the quantile condition when it is equal to the switch-over key value. The switch-over key value may be determined using a bandwidth offset based on the merge bandwidth of the database 845. The database 845 can have a bandwidth that indicating the rate at which new entries may be added. The merge tracker 835 can modify, adjust, or otherwise set the switch-over key based on the bandwidth offset of the database 845.

The run generator 825 can also identify a distribution of key values over the key domain in one or more data records in determining one or more quantile conditions for the merging of the run 820 to the merge level 850. For example, the run generator may determine the maximum and minimum key values in a particular key domain by using the maximum and minimum key values received in a particular set of data records. Using the distribution of key values, the run generator 825 can determine one or more quantile conditions that may be used to organize the scheduling of merge operations. For example, the run generator 825 may identify that the key values in a key domain range from 0 to 999. In this example, the run generator 825 can determine quantile conditions based on the fan-in of the subsequent merge level (e.g., how many runs on the current run level should be merged into a single run on the subsequent merge level). If the merge fan-in is four in this example, then the run generator may determine the quantile conditions to be 249, 499, 749, and 999.

The run generator 825 can also identify the rate at which the runs 820 can be established on the storage 815. For example, the rate at which the runs 820 are established may be limited by the speed at which the run generator 825 can sort the data records into a corresponding run. The rate at which the runs 820 are established may be limited by the computational effort required to sort the data records into a corresponding run. Based on the rate at which the runs can be established, the run generator 825 can set a bandwidth that determines that rate at which records may be merged onto one of the merge levels 850 on the database 845. The bandwidth can be used to determine the quantile condition as discussed above.

The merge tracker 835 can determine that the merge index does not satisfy any of the quantile conditions. When the merge index is determined not to satisfy the quantile condition, the merge tracker 835 can continue to track the merging of one run 820 onto the merge level 850. Conversely, the merge tracker 835 can determine that the merge index satisfies one of the quantile conditions. For example, if the merge handler is performing a one-way merge of run 820A on merge level 850A into a run 820A on merge level 850B, the merge tracker 835 can track the progress of the merge and compare the merge index to a quantile condition. If the merge index reaches a quantile condition, for example, the merge index is equal to a predetermined value, the merge tracker 835 can cause the merge handler 830 to add another run 820B on merge level 850A to the one-way merge to initiate a two-way merge. Subsequent to the addition, the merge tracker 835 can continue to track the merge index of the merge of the run 820 until the merge of the run 820 has been completed after successive quantile conditions are satisfied.

When the merge index is determined to satisfy the quantile condition, the merge tracker 835 can initiate the adding of another run 820 to the merge level 850 to perform a multi-way merge. The merge tracker 835 can identify a subset of the run 820 to add to the merge level 850. In some implementations, the merge tracker 835 can determine a subset of data records in the run 820 that satisfy the quantile condition. Determining the subset of data records can include comparing the key values in the data records to the quantile condition. When the key values in the data records are greater than the quantile condition, then those data records may be added to the subset. For example, the quantile condition may correspond to a temperature of 50° C., the merge tracker 835 can identify a subset of data records with temperature values over 50° C. to the merge level 850. The merge tracker 845 may also identify the subset based on the merge index. For example, the subset of data records can be any data records that are in a position in a buffer that is greater than the merge index.

Furthering this example, if a second quantile condition is reached, the merge tracker 835 can identify a second subset of records in a third run 830C that satisfy the second quantile condition. Responsive to the identification of the second subset of records, the merge tracker 835 can then initiate adding of the identified second subset of the run 820C to the merge of 820A and 830B to create a three-way merge. The merge tracker 835 can continue this process if there are a sufficient number of quantile conditions and runs 820A-N to initiate up to an N-way merge, where N in this case is the number of runs in the storage 815. The merge tracker 835 can also perform this process on the runs of any merge level 850 in the database 845.

In some implementations, the merge tracker 835 can determine that the run index has satisfied the quantile condition. The run index can satisfy the quantile condition when it has assembled a number of key values in a run 820 to that exceeds a threshold. In some implementations, the merge handler 830 can add a run 820 of a merge level 850 to an existing merge when the run index of the respective merge level 850 satisfies the quantile condition. For example, a one-way merge of run 820A is underway on merge level 850A into a run 820A on merge level 850B. The merge handler 830 can add a second run 820B on merge level 850A to the one way merge when the run generator 825 determines that the run 820B satisfies the quantile condition. The merge tracker 835 can also determine one or more quantile conditions based on the distribution of key values in the key domain.

In some implementations, the merge tracker 835 can determine, while performing the merge, whether all of the data records in the run 820 are added to the merge level 850 in the database 845. For example, the merge tracker 835 can determine that the merge index of the merge between the first run 820A and the second run 820B is equal to the maximum value in the key domain. In this example, because the merge takes place from the minimum key value to the maximum key value over the key domain, this condition would indicate that all key values in the run 820A have been merged into the run present in merge level 850A on database 845. Because merges with more than one run 820 are initiated responsive to the merge index determined to equal a quantile condition and additional runs are added to the merge at the merge index, that there may be data records in the run 820B that have not been merged into the run on merge level 850A in database 845. With the determination that the merging of the records of the first run 820 are not all added, the merge tracker 835 can track the merge until the merge index reaches a quantile condition, or the merge is determined to be complete.

With the determination that the merging of the records of the first run 820 are all added to the first merge level 850A, the merge tracker 835 can release the buffer in storage 815 containing the run 820A to receive data records for an additional run 820C. For example, the run 820A may occupy a certain amount of space in storage 815, and the storage may be limited. In this case, because the data records also exist in the merged run in merge level 850A in the database 845, keeping the data records in storage 815 is now redundant. The merge tracker 835 can release the region of memory occupied by the run 820A on the storage 815.

In some implementations, the merge tracker 835 can determine whether the merging the merge level 850 on the database 845 is complete. For example, the merge tracker 835 can track the merging of the records in the first run 820A and the subset of the records in the second run 820B into onto the first merge level 850. In this example, the merge tracker 835 may determine that merging is complete, when the merge index of the merge has reached the maximum key value. In some implementations, the merge tracker may determine that all data records in the run 820A have been merged into the first run in the merge level 850A on the database 845. When the merging is determined to be incomplete, the merge tracker 835 can track the merge until the merge index satisfies quantile condition, or the merge is determined to be complete.

When the merging is determined to be complete, the merge tracker can begin merging the remaining subset of data records in the second run 820B from the minimum key value of the key domain into a second run in the merge level 850B on the database 845. The merge can be maintained by the merge handler 830 in a steady-state at each merge level 850 by continuously merging the data records left over from previous merges into additional runs for the next merge level. In some implementations, the merge handler 835 can initialize, another run 820 on another merge level 850B on the database 845. The merge handler 835 can begin merging the remaining data records in run 820B into the second run in the merge level 850A on the database 845. In some implementations, the merge handler 835 begins merging the remaining data records from the minimum key value, as described above.

The query handler 840 can receive a query for one or more records maintained on the database 845. The query may be generated and transmitted by a computing device connected via the network 810. In some implementations, the query handler 840 can receive the query via network 810. The query can be a request for one or more data records, and can include information identifying a particular key value. In some implementations, a query can include a request for all data records with a particular range of key values. For example, the query handler 840 may receive a query for all data records with a temperature reading between −50° C. and −10° C. The query handler 840 can identify the key values within the key domain that satisfy the condition specified in the query, and begin searching the storage 815 and the database 845.

Using the query, the query handler 840 can search at least one of the merge levels 850 maintained on the database 845. In some implementations, the query handler 840 can use the query to search at least one of the runs 820 on the storage 815. The searching can occur concurrent to the establishment of runs 820 and the merge of runs 820 onto merge levels 850. The merge level 850 searched using the query can include data records from one or more runs 820 (e.g., from a previous merge level 850). The number of data records merged onto the merge level 850 may be dependent on the quantile condition. For example, for a two-way merge, the all the records from the first run 820A may be included in the merge level 850, while a subset of the records from the second run 820B may be included in the merge level 850.

In performing the search, the query handler 840 can identify at least one of the merge levels 850. In some implementations, the query handler 840 can identify at least one of the merge levels 850 determined to be complete. In this manner, the query handler 840 can avoid searching merge levels 850 with incomplete merges or unfinished runs 820, thereby reducing the number of searches performed. The merge level 850 identified by the query handler 840 may correspond to the most recently completed merge. With the identification of the merge level 850, the query handler 840 can identify the data records in the identified merge level 850 matching the query. In some implementations, the query handler 840 can identify the data records matching the key values specified by the query. For example, the query handler 840 can find data records with temperature readings between −50° C. and −10° C. as requested in the query. In some implementations, the query handler 840 can determine whether the data records matching the key values specified by query exist on the database 845.

Upon identification, the query handler 840 can generate a response based on the searching using the query. In some implementations, the query handler 840 can include the data records matching the query into the response. In some implementations, the query handler 840 can include an indication specifying whether the database 845 contains any record matching the query in the response. With the generation, the query handler 840 can transmit the response via the network 810 to the computing device that sent the query.

Well-Paced Staggered Merging

The above describes adding runs to merges in a staggered fashion. The merge may be a continuous merge going over the key domain again and again, adding runs at quantile key values and dropping them after one complete cycle over the key domain. For merge fan-in F, the desired quantile key values may be the 1/F quantile, 2/F quantile, etc. The merge produces one output run per cycle, switching to the next output run when rewinding from +∞ and −∞. The quantiles can be estimated and estimates can be adjusted at the expense of temporarily running a merge step with F−1 or F+1 input runs between the old and the new estimated quantile key value.

Ideally, the merge progresses through the key domain such that it reaches the next quantile when the run producer, e.g., run generation, finishes its next output run. In that case, each new run joins the merge step immediately after it is complete. The merge step continues its progress through the key domain, so the newly added run joins at the appropriate quantile key value.

During initialization of a merge level, the merge fan-in builds up, starting as a "1-way merge" as soon as the run generation finishes its first run, becoming a binary (2-way) merge when run generation finishes its second run, etc. It becomes a full F-way merge when run generation finishes its Fth run, such as when a merge pattern starts its first merge step. With runs exiting and entering the merge logic at each quantile, the merge remains a stable F-way merge after initialization of a merge level. During initialization, the merge bandwidth may be proportional to its current merge fan-in.

Starting the 3rd Run

Figure 9A:
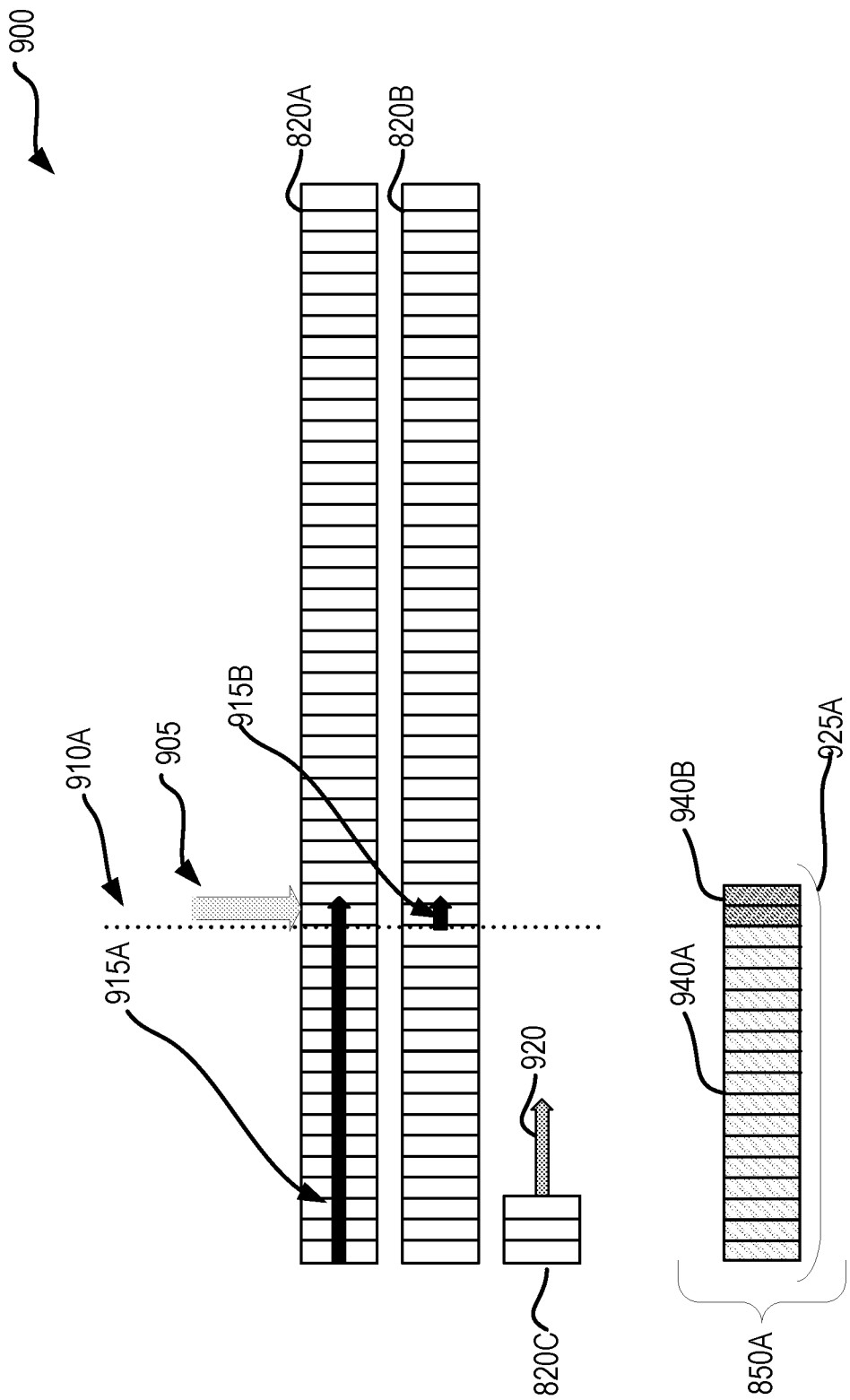
FIG. 9A shows a diagram illustrating a one-way merge becoming a two-way merge responsive to the merge index reaching a target quantile.

Referring now to FIG. 9A, depicted is a point of time during the initialization of a merge level. The writer 920, e.g., run generation, has recently finished the 2nd run 820B and has started the 3rd run 820C. When that happened the reader 915, e.g., merging level-0 runs 820 to create the first level-1 run 925A, became a binary merge. In this example, the merge index 905 has recently crossed the quantile condition 910A. Before this event, the reader 915A was performing a one way merge, assembling the records of the first data run 820A into the first region 940A of the first level-1 run 925A of the merge level-1 850A. After the merge index 905 exceeds the quantile condition 915B, the reader 915B begins merging both runs 820A and 820B starting at the merge index. Note at this stage, this leaves a subset of data records in 820B unmerged. The result of the two-way merge of 820A and 820B are also added to the level-1 run 925A. The segment of 925A representing the result of the two way merge is emphasized as 940B.

In the context of FIG. 8, the merge handler 830 can perform a first merge 915A using the records of the first run 820A onto a first merge level 850A. The merge tracker 835 can maintain the merge index 905, and determine whether or not it has reached the quantile condition 910A. When it does, the merge handler 830 can add to the merge 915A the second run 820B creating a two way merge 915B. The results of the second merge are maintained in the database 845 in a run 925A in the merge level 850A.

The merge tracker 835 can track the first merge 915A using a merge index 905. For example, the merge tracker 835 can continuously track the progress of the first merge 915A by determining the key value of the merge index 905. If the key value satisfies a quantile condition 910A, the merge handler 830 can add the second run 820B to the merge 915B. The resulting merge is stored in merge level 850A in run 925A, where 940A indicates the section of the run 925A corresponding to the one-way merge and 940B indicates the section of the run 925A corresponding to the two-way merge.

The run generator 825 can write a run 920 into storage 815 of the data processing system 805. The run generator 825 can write a run 920 concurrent to the merge operation 915A-B. While the two-way merge is occurring between runs 820A and 820B, a third run 820C is being generated and stored in a corresponding buffer in storage 815.

Finishing the 3rd Run

Figure 9B:
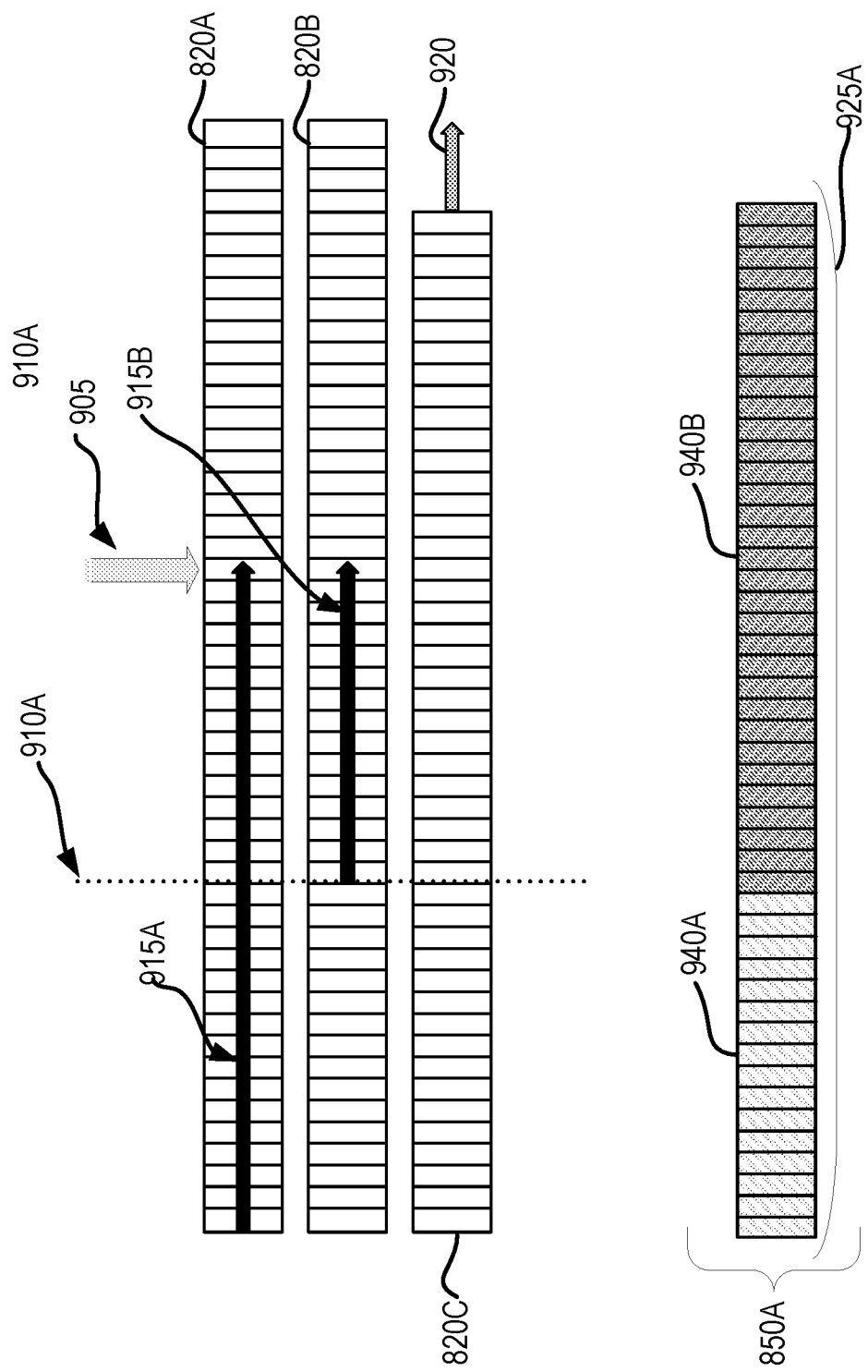
FIG. 9B shows a diagram illustrating a two-way merge continuing while a third input data stream is concurrently being assembled.

FIG. 9B shows a later point in time during the initialization of a merge level. The writer 920 is about the finish its 3rd run and the reader is about to expand the 2-way merge into a 3-way merge.

The first run 925A of the merge level 850A now includes the first plurality of data records 940A and the merge of the first and second plurality of data records 940B. At this stage, the run generator 825 may be about to complete assembling the third run 820C. The merge index 905, tracked by the merge tracker 835, may also about to reach another quantile condition. When the merge index satisfies the quantile condition, and the run 820C may be complete, the merge handler 830 can add the third run 820C to the two-way merge to create a three-way merge.

Starting the 4th Run

Figure 9C:
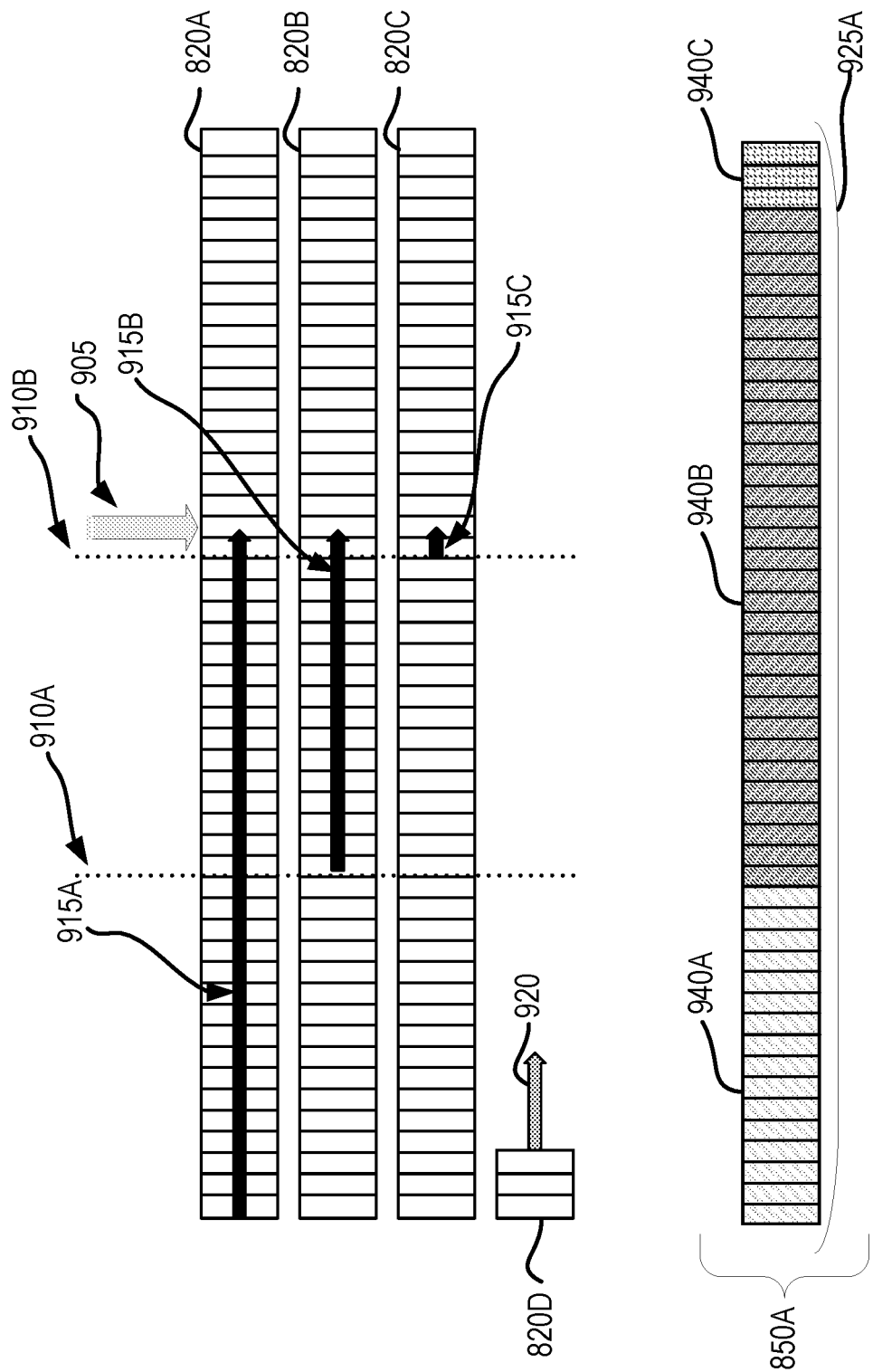
FIG. 9C shows a diagram illustrating a two-way merge becoming a three-way merge responsive to the merge index reaching a target quantile.

FIG. 9C shows another point in time during the initialization of a merge level. When the writer finished the 3rd run and started the 4th run, the writer expanded the 2-way merge into a 3-way merge.

The merge tracker 835 may have detected that the merge index has satisfied a second quantile condition 910B, and the run generator 825 has completed the generation of the third run 820C. As a result, the third run has been added to the merge operation with reader 915C. The merge level 845A now further comprises the merge of the first, second, and third plurality of data records 940A-C respectively. Concurrently, the run generator 825 begins to assemble the fourth run 820D of merge level-0 by writing 920 the run 820D to the storage 815 on the data processing system 805.

Completing Merge Level Initialization

Figure 9D:
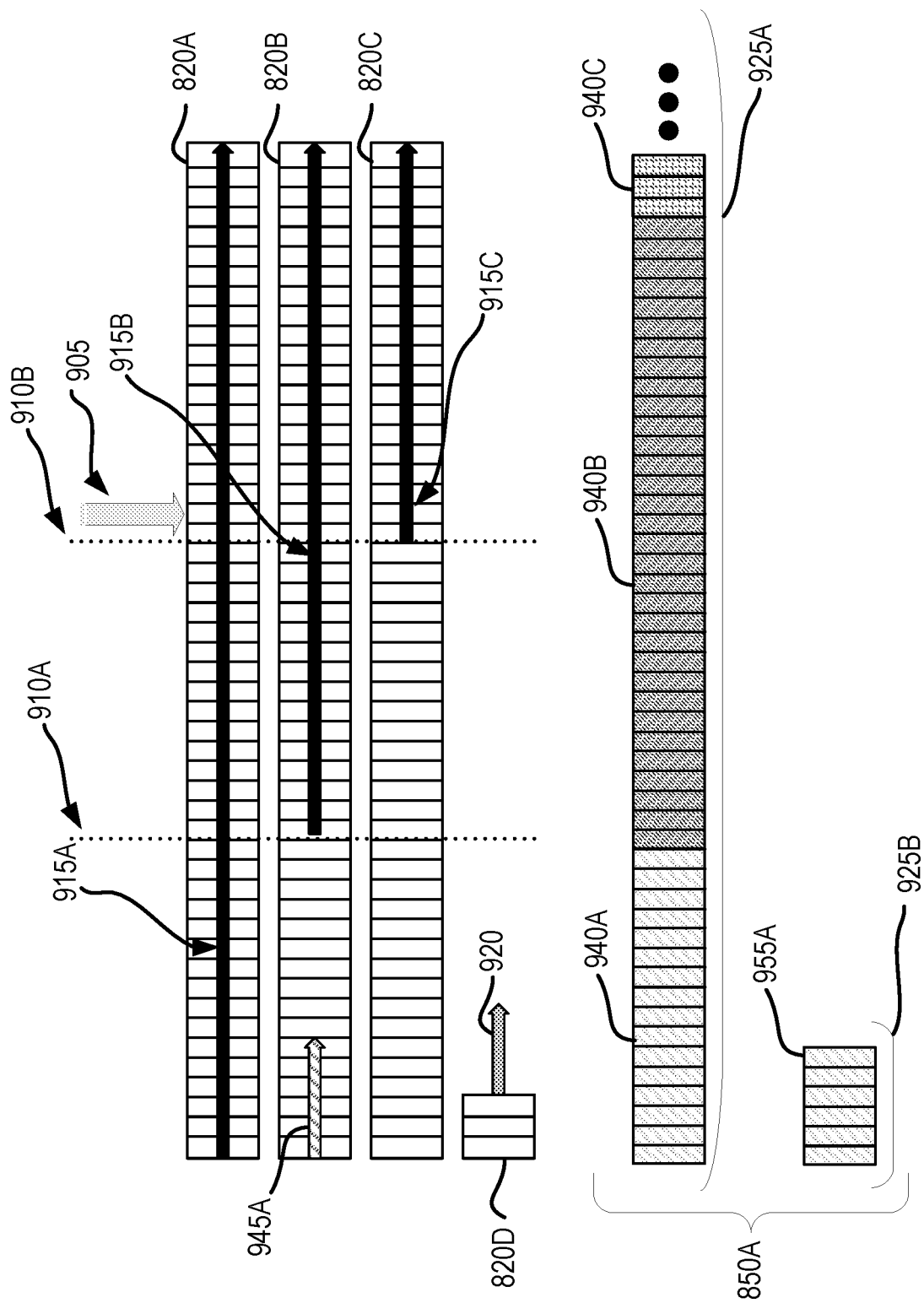
FIG. 9D shows a diagram completion of completion of a merge level initialization.

FIG. 9D shows the completion of the merge level initialization, where the first full output run 925A has been completed. At this stage, the entire merge level-0 run 820A has been merged into the next stage, but runs 820B and 820C still have data records that remain unmerged. At this point, the merge of a second merge level-1 run 925B begins. The merge handler 830 begins a one-way merge with the run 820B starting from the minimum key value of the key domain, writing the data records to the second run 925B in the merge level 850A.

After the first full output run, a merge level is fully initialized. At that time, the next merge level begins its initialization. Thus, there may be one merge level in initialization at all times. The other merge levels may run with a bandwidth equal to run generation. Thus, the amount of temporary storage for each level of runs remains constant (except for rounding). The amount of temporary storage currently in use can be used as a means to pace a merge level, which should run at full bandwidth whenever the size of its input exceeds the allocated temporary storage.

With the merge paced such that an input run is dropped (after a full cycle) when another input run is ready to be added, queries find F completed runs at each merge level. Any query can involve searching of F partitions on each merge level, except the top-most level still in initialization. F runs per merge level represents an improvement of 3:2 compared to the merge and search policies, (e.g., from 1.5F on average to F fixed).

Eager Staggered Merging

Well-paced staggered merging drops input run j and adds input run j+F at the same time and at the same key value. For best performance, it depends on a merge reaching switch-over key of input run j as input run j+F is completed. In contrast, eager staggered merging adds run j+F whenever that run is completed, whether or not input run j has been merged completely. The switch-over key value for input run j+F set by the current progress of the prior merge step; it might be lower or higher than the switch-over key value of input run j.

In eager staggered merging, the merge fan-in varies over time around a target fan-in F. The data ingestion bandwidth and the fraction of current to target fan-in f/F should guide the pace of the merge progress. However, if the temporary storage for merge input exceeds a threshold, the merge should proceed with maximal (unconstrained) bandwidth. The threshold should equal F runs plus some tolerance, say 20%.

Racing Staggered Merging

An alternative approach focuses on run representation as linear partitioned b-tree and its key-pointer pairs in the in-memory index. Here, that the assumption may be that runs of the same merge level form linked lists, that the in-memory index holds key-pointer pairs for the most recent run in each level, and that level indicators and run numbers extend key-pointer pairs to quadruplets. For the level indicators, run generation produces runs of level 0, etc.; and run numbers simply count the runs that ever have existed on a given merge level.

In this data and storage structure, the in-memory index is to be as persistent as the file(s) representing runs and partitions. This requires that the in-memory index be transactional, with not only concurrency control due to run generation and multiple merge processes modifying it concurrently but also durability such as logging and recovery. Details of concurrency control, logging, and recovery for the in-memory index are disclosed in a later section. Details of logging and recovery of data contents, e.g., when and where they are logged or mirrored, are omitted here.

Run generation incrementally spills data records from the in-memory index to an on-storage partition, moving existing key-pointer pairs (or actually quadruplets, see above) for the most recent level-0 run into the current level-0 run and retaining key-pointer pairs for the current level-0 run in the in-memory index. Once a new key-pointer pair is committed in the in-memory index, it and its data contents are available for querying; and once a key-pointer pair is moved from the in-memory index to an on-storage partition, queries can access it indirectly. Merge processes do the same as run generation when they produce a new run as their merge output: incremental spilling, moving existing key-pointer pairs from the in-memory index into the merge output, etc.

Racing Staggered Merging

FIG. 9E shows the race between reader and writer. As soon as the writer is ahead of the reader in terms of key values, the reader expands the merge fan-in. Here, the writer is still working on the 2nd run yet the reader already has expanded its merge to a 2-way merge. Compared to FIG. 9A, the binary merge commences much earlier, with written key values waiting even less until being read.

The merge tracker 830 can track the racing merge using the merge index 905, and begin a two-way merge as soon as the target quantile 910A is reached. In the case of racing merge, the two-way merge 915B begins before the second data run 820B has been completely established. This means that the writer 920 and the read 915B can 'race' to the end of the run as the run generator 825 generates the run 820B. The result of the merge is a run 925 in merge level 850A. The one-way merge portion of the run 925 is labelled as 940A, and the two-way merge portion of the run 925 is 940B.

Queries prefer merge output over merge input, thus searching one place rather than F places. Based on the transactional updates of the in-memory index, a merge step (level) includes a new input partition as soon as the logic creating the input partition reaches key ranges higher than the merge step. A query ought to never search a partition if it can search the next merge level instead. Note that writing a new partition ought to take F times less time than reading it as one of F inputs in a merge step; thus, a writer will eventually catch up to the reader and then stay ahead of it.

The merge logic notices the additional merge input by means of the run number in the key-pointer quadruplet.

A query with a random search key at a random point in time has a 50% probability that it takes to search F merge inputs and an equal probability that it can search the merge output. Thus, on average, a query involves searching of F/2 partitions on each merge level. This is an improvement of 3:1 compared to the merge and search policies.

Index Contents and Maintenance

The in-memory ordered index can facilitate run generation as well as management of runs on storage. For run generation with input data records, the index supports replacement selection and thus initial runs twice the size of memory. This assumes run generation in steady state and random input; some memory is lost by in-memory fragmentation due to variable-size records and some memory occupied by key-pointer pairs of preceding runs.

The in-memory index also holds anchors to linked lists pointing into the most recent run at each merge level. For higher merge levels and their very large runs, the runs may have parent or even general-purpose levels and the entries in the in-memory index point into those. These most recent runs point into earlier runs on the same level.

Figure 10:
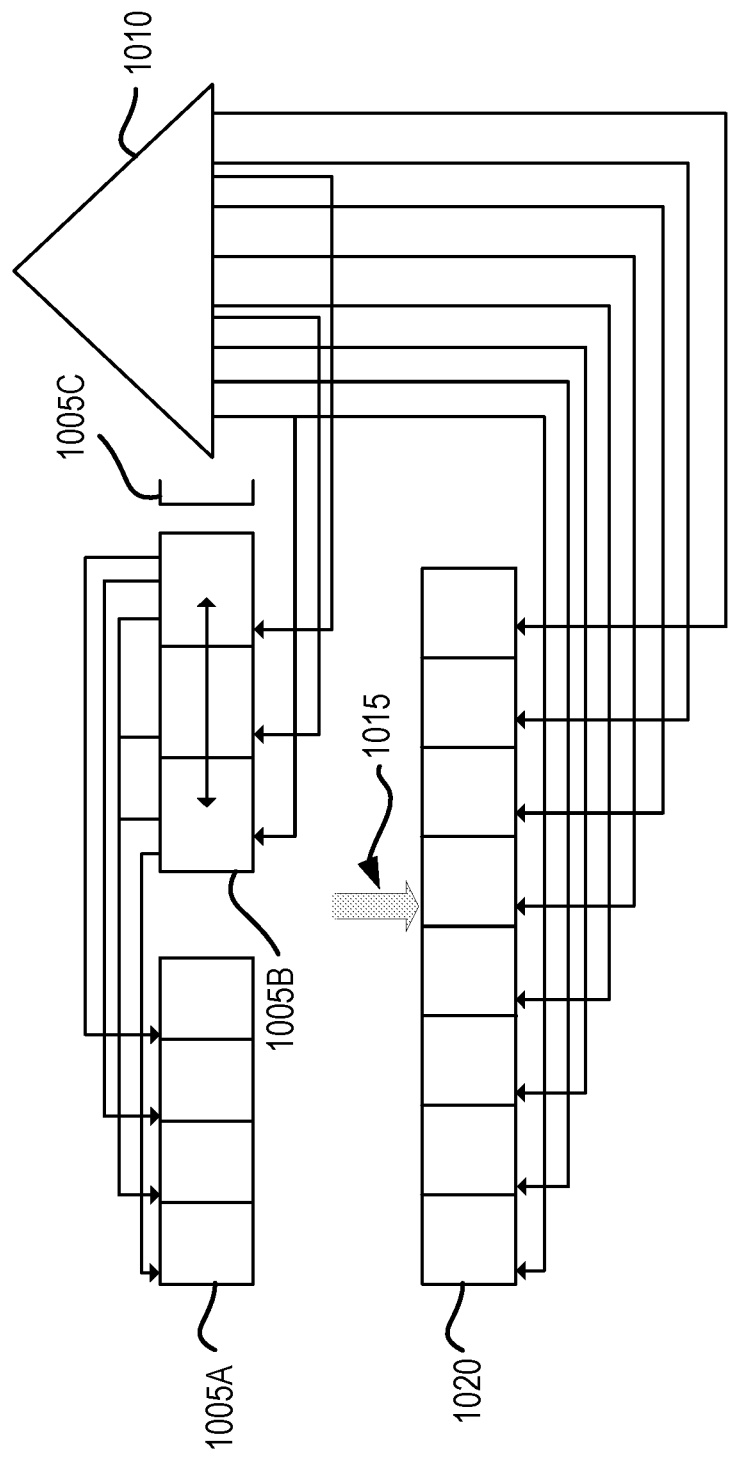
FIG. 10 shows a diagram illustrating an in-memory index and its associated key-pointer pairs.

FIG. 10 illustrates how the in-memory index 1010 references pages in runs on two merge levels. There is one level-1 run 1020 and two level-0 runs 1005A-B, with a third run 1005C being started. The most recent level-0 run 1005B holds key-pointer pairs referencing pages in the older level-0 run 1005A. The merge index 1015 is tracked by the merge tracker 830

When the eviction scan advances in run generation, both data records and key-pointer pairs for the most recent level-0 run are written to the current level-0 run; key-pointer pairs for the current level-0 run are saved in the index. This process runs whenever memory fills up, wrapping around from key value +∞ and −∞ as appropriate and starting a new level-0 run at those times. Concurrency control and recovery for the index are covered below.

Each merge level advances mostly independently of run generation and of other merge levels. The relationship is that each level after completed initialization processes about the same data volume such that the required temporary storage remains constant for each level of runs.

Each merge step removes key-pointer pairs of the merge inputs and inserts key-pointer pairs of its merge output. It also moves key-pointer pairs into the merge output, namely those of the most recent prior run on the level of the merge output. Thus, the in-memory index continues to hold key-pointer pairs for the most recent run in each level.

Figure 11:
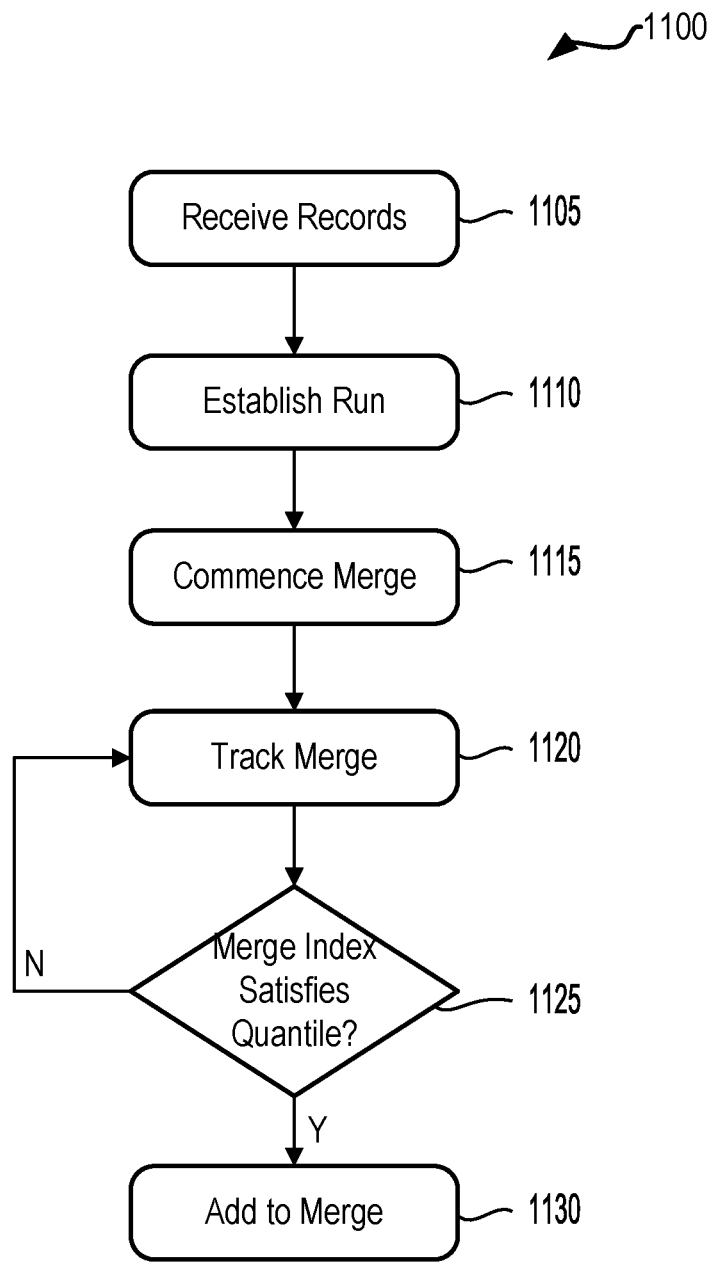
FIG. 11 shows a flow diagram of an example method of maintaining key-value stores by performing staggered merging.

Referring now to FIG. 11, depicted is a flow diagram of a method 1100 for maintaining key-value stores by performing staggered merging. The method 1100 can be implemented or performed using the data processing system 805 detailed herein above in conjunction with FIG. 8 or the computer system 1200 described herein below in conjunction with FIG. 12. In brief overview, a data processing system can receive data records (1105). The data processing system can establish a sorted run of data records (1110). The data processing system can commence a merge operation (1115). The data processing system can track the progress of one or more merge operations (1120). The data processing system can determine if the merge index satisfies a quantile condition (1125). The data processing system can add another sorted data run to the merge (1130).

The data processing system (e.g., the data processing system 805) can receive data records (1105). The data records can include one or more key values that correspond to a key domain. The key domain can have a minimum value and a maximum value. The data records can be received continuously throughout the execution of the method. The data records can be received, for example, via the network 810. The data records can also be received directly from a data acquisition source, for example data acquisition source 855. The method can also add key values corresponding to the time of their receipt to each data record.

The data processing system can establish runs (1110). The data processing system can establish sorted runs (e.g., runs 820) from the data records received in (1105). The runs can be indexed by key value. For example, establishing a run may include establishing a b-tree or a variant of a b-tree data structure with the data records received in step 1105. The run can be established by indexing one or more key values present in the data records and inserting them into a sorted data structure. The runs can also be established by inserting each data record into a data structure, and then performing a sorting algorithm on the data structure. The runs can be established, for example, by the run generator 825.

The data processing system can commence a merge operation (1115). The data processing system may commence a merge operation from the one or more runs established. The merge operation can generate a run for a subsequent merge level. The merge operation can commence from the minimum key value and progress to the maximum key value in the key domain. The resulting run of the merge can be inserted into a merge level on a database, for example a merge level of the database. The resulting run of the merge can include all of the data records in the one or more runs used in the merge operation.

The data processing system can track the merge operation (1120). The data processing system can track the progress of a merge operation using a merge index. The merge index can track the current key value of the merge operation in. The data processing system can track the merge by comparing the current key value of the merge to the key domain of the merge level. The data processing system can also track the merge by counting the number of records that have been merged into the next merge level.

The data processing system can determine if the merge index satisfies a quantile condition (1125). The data processing system can compare the merge index to a quantile condition. The quantile can be a certain key values, and can be predetermined or dynamically determined. For example, if the merge index equals the key value, the quantile condition has been met. The quantile condition can also be a number of merged data records. For example, if the number of merged data records exceeds a certain threshold, the merge index satisfies the quantile condition. If the merge index is determined to not satisfy the quantile condition, the data processing system can repeat the functionality of (1120).

If the merge index is determined to satisfy the quantile condition, the data processing system can add a second sorted run (e.g., the second run 815B) of a data records to the merge (1130). The data processing system can add a second data run established in to the merge, starting a two-way merge at the current merge index, and continuing the merge until the merge is complete. The data processing system can continue to add runs to the merge until the merge level reaches a steady state. The merge level is in a steady state when the rate at which data records are available to merge is equal to the rate at which the data records are merged.

These insertions should be incrementally as the merge progresses, striking a balance between overhead and low-latency incremental accounting of merge progress. When committing a key range in the merge output, the new boundary key (as a key-pointer pair) points to the new merge output for lower key values and to the preceding run for higher keys; moreover, for runs on the level of the merge input, the same key value is to point to runs preceding the merge input for lower key values and to the remaining merge input for higher key values. Again, the concurrency control to coordinate active queries, future queries, etc. is discussed below.

Bulk Deletion

"Range deletion" is a powerful feature already included in the original design for log-structured merge-trees. It can be generalized to add a scan predicate, called a "seargable predicate" in query optimization.

A special "range deletion" record specifies a key range and optionally a scan predicate. It "sorts" before valid records in that key range. A merge step applies the range deletion and suppresses the range deletion record in the merge output. In some situations, it might be required that a single "range deletion" record splits into multiple such records with complementary key ranges. For example, if a merge step handles a limited key range and if that key range ends before the end of the range deletion, then the remaining key range requires its own "range deletion" record. A later section covers range deletion in the context of snapshot isolation and multi-version storage.

Storage Space Reclamation

After a merge step copies data from its input runs (partitions) to its output run (partition), the input data can be erased and the storage space released. There are, however, two difficulties with that. First, space reclamation may proceed at a granularity of pages (or groups of pages); and second, while some active query execution plan still relies on one of the input partitions, that space may not be released. The second concern is one of concurrency control and is addressed in a later section; suffice it here to mention snapshot isolation and multi-version concurrency control. The first concern is discussed here.

A storage page is ready for release when the last pointer to it is erased. In case there are multiple pointers, e.g., from multiple data pages in the subsequent partition, the rightmost of these pointers matters (in the sense that merge steps proceed left-to-right through the key domain). In other words, if a page pointer is erased in a data page and that same data page contains another pointer to the next data page, then the first pointer and its referenced data page become obsolete and the page can be reclaimed as free space.

When a data page is reclaimed, the page pointers it contains are erased. All but the right-most of those page pointers is the right-most pointer to the referenced data page in the preceding partition; therefore, those data pages are also erased. If those data pages themselves contain page pointers, the same logic applies all the way to the oldest run (partition) of the merge level. In this way, reclamation of a data page in the most recent run (partition) within a merge level may propagate through the entire merge level, through all runs in the same merge level.

Page pointers in the in-memory index work slightly differently but with the same intent. If a merge step progresses over a key-pointer pair in the in-memory index, then the preceding key-pointer pair becomes obsolete and the underlying page may be logically deleted, subject to multiversion concurrency control for key-pointer pairs in the in-memory index. When the logical deletion becomes a physical deletion and the key-pointer pair in memory is erased, then the underlying storage page can be reclaimed. Reclamation of that storage page might also reclaim data pages in preceding partitions following the logic outlined above. A LRU buffer pool policy should avoid all I/O during this process.

For correct application of range deletion, a "range deletion" record should be repeated as the first key value in each affected index node, including its timestamp. This starts in the in-memory index and merge steps carry and repeat the "range deletion" record to each affected index node in their output. Queries find "range deletion" records and apply them in their own merge logic constructing the query result.

Summary of Staggered Merging

In summary of staggered merging, linear partitioned b-trees may be used as a storage structure for efficient merge and search. An in-memory ordered index may hold both data and key-pointer pairs (actually quadruplets); data on temporary storage can be in any storage structure that permits direct page access and, for incremental space reclamation, page-by-page release may be used. Staggered merging consumes much less temporary storage space than other designs for log-structured merge-tree and it permits, for a given merge fan-in, much faster queries.

Schema Changes

There is a wide variety of possible schema changes. Important here is the distinction between schema operations that require data movement and those that don't. An example of the former is index creation; an example of the latter is dropping an integrity constraint. This section covers the mechanisms of data movement for schema changes and ignores all other aspects.

Index Creation

Index creation may involve the creation of a new secondary index in the form of a log-structured merge-tree. Efficient creation of a b-tree index requires scanning the data source to extract new index entries, sorting them, and constructing branch nodes while appending index entries on leaf nodes. Here, sorting is not required; instead, the new index entries are inserted in random order and the logic in the log-structured merge-tree ensures efficient in-memory run generation, merging runs, creation and maintenance of branch nodes, etc.

Once a new index is defined and its existence committed, all future insertions into the database table insert appropriate new index entries as they would for older secondary indexes. In order to backfill the new index with entries for old rows in the table, one can scan the table or one can add side effects to subsequent merge steps in the table. The table scan may include all partitions within its log-structured merge-tree.

The details of the logic for getting the correct set of index entries from multiple merge steps are omitted here. Note that, if all new index entries come from merge steps, the delay until index completion can be rather substantial.

The new secondary index becomes available to query execution when its contents are complete. Merging its partitions will continue for as long as insertions continue into the underlying table.

Index Removal

The principal technique for index removal is range deletion, as discussed above. The specifics depend on how the removed index fits into the log-structured merge-tree. If the removed index is concatenated with other indexes (e.g., in the final sort order the removed index represents a contiguous key range), the range deletion record specifies a key range. If, on the other hand, the removed index is interleaved with other indexes in a merged index, then the range deletion record specifies a range equivalent to the merged index plus a scan predicate equivalent to the removed index.

Rollup Creation and Removal

A rollup is a materialized view defined by a query with a "group by" clause but without joins; it may have a selection if the predicate can be evaluated one row at-a-time, without nested queries. A rollup is stored in a primary index and it may have secondary indexes.

Creation and removal of these indexes, including materialization of the rollup in its primary index, works very much like index creation and removal for tables as discussed above.

Re-Partitioning

The principal work in re-partitioning is data movement. It may be implemented as deletion and insertion. Part of the problem is that the insertion requires a scan, but that is also an opportunity: the scan can implement the deletion as side effect. Moreover, scan and deletion can be side effects of a merge step. In other words, what is desired is something like a "delete into" operation that scans, deletes, and produces an output stream that can be re-partitioned and then feed the insertion logic. The insertions are processed as if these records were entirely new information, using the standard insertion logic with run generation and multiple merge levels.

Summary of Schema Changes

In summary, schema changes that require data movement may be mapped to scans plus insertions of new index "bulk deletion" entries or appropriate anti-matter. These insertions may go through in-memory run generation and multi-level merging very much like new data records captured by an application.

Operations

The present section covers operations including synchronization of primary and secondary indexes, concurrency control, logging, and recovery. When run generation and merging record all their activity in the in-memory index, concurrency control, logging, and recovery all focus on the in-memory index, or actually the key-pointer pairs. Concurrency control for data records is implied (all partitions are read-only once written) and recovery of partition contents relies on forcing their data pages to storage before committing them.

Synchronization of Primary and Secondary Indexes

There are two aspects of synchronizing primary and secondary indexes. First, they ought to contain the same logical rows and thus should, after each transaction, contain the same number of index entries. Second, in the context of log-structured merge-trees, it should be easy and efficient to navigate from an entry in a secondary index to the corresponding entry in the table's primary index.

The first issue is covered by creation of one index entry for each index from each row in the input stream. This includes replacement entries for logical updates and tombstone entries for logical deletions.

The second issue can be addressed by synchronizing the merge steps of a table's primary and secondary indexes. While more complex designs are possible, it seems sufficient to put a table's primary and all secondary indexes into the same log-structured merge-tree, in the spirit of a merged index, with the index identifier as artificial leading key field in each index entry. In this case, merge steps always affect all indexes equally. In fact, a single log-structured merge-tree may hold multiple related tables and all their indexes. The search effort grows in each root-to-leaf tree search by log $2K$ comparisons for K tables and indexes. Prefix truncation reduces the storage overhead to a vanishing level.

Late Arrivals

Late arrivals are a notorious problem in stream processing and stream indexing. For most data items, there is a high correlation (and a small difference) between event time (also known as user time or real-world timestamp) and arrival time (also known as system time and capture timestamp). Late arrivals are the exceptions that break the correlation with a large difference between event time and arrival time.

If a table's column indexed with a b-tree has a high correlation with another column, augmenting each parent-to-child pointer in the b-tree with a key range for the other column creates a very effective index for that other column. This is related to zone maps (and other small materialized aggregates) focusing on minimum and maximum values for all columns in a table. Integration into a b-tree structure naturally creates a hierarchical variant thereof. An obvious further variant omits minimum and maximum values for columns with weak correlations to the indexed column. For relational keys and other columns with equality predicates only, bit vector filters may replace or augment the minimum and maximum values. Zone filters, in addition to minimum, maximum, and bit vector filter, also permit 2nd-to-minimum and 2nd-to-maximum key values to cope with strong outliers.

Log-structured merge-trees can also benefit from zone filters. With a log-structured merge-tree formatted as a partitioned b-tree, with runs representing partitions on arrival time, and with high correlation between event timestamp and arrival timestamp, minimum and maximum values permit efficient search on event time. If late arrivals are sufficiently rare, 2nd-to-minimum values of event timestamp permit very sharp filters embedded in the index structure.

This applies to any index and any attribute; the relevant correlation is with the partitioned attribute (e.g., capture timestamp), not the indexed attribute. For example, a web service may index its log on user identifier using a log-structured merge-tree represented by a partitioned b-tree. A zone filter attached to each parent-to-child pointer within this b-tree may indicate a range of event timestamps. These zone filters are likely ineffective for parent-to-child pointers and may be omitted. However, where the parent-to-child pointers separate partitions and thus key ranges in arrival timestamps, minimum and maximum value speed up searches by event timestamp. If there is a late arrival among the web log records (e.g., a particularly low event timestamp), the minimum value may be deceiving whereas a 2nd-to-minimum value attached to a parent-to-child pointer guides any future search very precisely.

Adaptive Merging by Index and by Key Range

Adaptive merging in a partitioned b-tree scans and deletes a key range in multiple runs and merges these index entries into a higher-level run. It is usually, but not necessarily, a side effect of query execution. The key range may follow a query predicate, but not necessarily. For example, in a merged index with many indexes concatenated, a merge step may focus on one of those indexes. In that case, the index identifier is the leading key field after the partition identifier and an equality predicate on the index identifier delimits the adaptive merge step.

One issue is that adaptive merging for a specific key range invalidates the assumption of strictly left-to-right merging. Thus, the starting key value requires special attention within the in-memory index coordinating all merge and search activity in the log-structured merge-tree. Within the key domain of a log-structured merge-tree, the starting key value of an adaptive merge step requires a new key-pointer pair in the in-memory index. If the adaptive merge step extracts and deletes index entries from all runs, the new key-pointer pair contains a null pointer; otherwise, it points to the most recent run not included in the adaptive merge step. In storage space reclamation, a key-pointer pair referencing an older run permits release of a page referenced by a lower key value.

In tables or views with secondary indexes in addition to a primary index, merging by key range within a single index destroys the one-to-one mapping between partitions in primary and secondary indexes. In those cases, query may attempt to resolve row pointers by accessing the matching partition and then go to larger partitions (e.g., merge output) as required.

Concurrency Control

Run generation and merging modify run files and their entries in the in-memory index while the same in-memory index guides queries inspecting the same partitions; therefore, some concurrency control is to be performed. Fortunately, concurrency control is focused on the in-memory index; the runs or partitions once written remain read-only until deleted.

The in-memory index holds both key-pointer pairs for the most recent runs on each merge level as well as data records for run generation. These data records are used for run generation; no concurrency control is required beyond the low-level concurrency control coordinating threads to protect the in-memory data structure. The key-pointer pairs may require transactional concurrency control. It may seem a good idea to have two in-memory indexes, one for data records and one for key-pointer pairs, but that design requires tricky merge and memory management logic in order to enable all desired functionality yet exploit all memory at all times.

With query execution plans finishing their work while merge steps replace key-pointer pairs according to their merge progress, the in-memory index requires multi-version concurrency control with snapshot isolation for read-only queries, locking for index updates in merge steps, and garbage collection when entries become obsolete.

In database indexes, deletion transactions turn valid index entries into ghosts (also known as pseudo-deleted records) and retain both the space and a lock on the ghosted index entry. Subsequent insertion transactions may erase unlocked ghosts, by invoking system transactions (also known as nested top-level actions). In storage structures with multi-version records, a ghost is a version record with its deletion or replacement committed before the oldest active read-only transaction; a tombstone record is a ghost when all preceding version records are gone and the tombstone is unlocked and committed. Insertions into the in-memory index, whether data records or key-pointer pairs, perform the required garbage collection by invoking system transactions for ghost removal.

Recovery

For the contents of partition files (e.g., data records), run generation and merge steps flush completed runs and even completed key ranges within their output runs. This includes all key-pointer pairs referencing the preceding partition as well as any zone filters attached to these key-pointer pairs. The techniques here apply to management of runs by reliable transactional recovery of key-pointer pairs in the in-memory index.

It seems that logical write-ahead logging can provide the required information and reliability for recovery from all failures (other than log failure). With a suitable organization of log records, e.g., backward chains of log records in the recovery log and partially sorted log records in the log archive, all forms of instant recovery are possible including single-page repair, instant restart, single-phase restore, instant restore, instant failover, and more. All these techniques rely on on-demand page-by-page restore and on-demand transaction-by-transaction rollback.

Logical recovery means that database page identifiers have no role or meaning; instead, logical recovery focuses on version numbers attached to unique key values. Log records contain backward chains by unique key value and checkpoint log records contain a list of possibly dirty (unwritten) unique key values. The equivalent to flushing dirty pages is writing a unique key value and all associated information.

Logging

Write-ahead logging may be required for changes in the in-memory index that affect key-pointer pairs, their values, and their placement in the index. Logical logging and recovery best serve such an in-memory database. With logical logging and recovery, restart after a system failure (with memory loss) creates a new in-memory index that contains key-pointer pairs, precisely as they had been committed before the failure. Thus, runs of all merge levels remain accessible. The storage logic for on-storage runs may remove uncommitted partial runs and key ranges.

An alternative design includes data records and on-storage runs in logging and recovery, with the advantage of a single code base and uniform guarantees for all recovery but with the disadvantage of a log volume as high as the data volume (or even somewhat higher).

Summary of Operations

In summary, the proposed techniques for log-structured merge-trees including the in-memory index and the staggered merge algorithms promise excellent operational characteristics. In addition to merge bandwidth and query latency, they promise steady continuous operation with no performance cliffs, support for redundant secondary indexes and materialized grouping views or rollups, and tolerance for late arrivals with minimal or moderate effect on query performance. Perhaps most importantly, proven techniques for concurrency control, logging, and recovery can provide concurrency, reliability, and availability to the central data structure, the in-memory index, and through that to all runs and partitions.

For physical recovery, log records refer to database pages and byte offsets; for "physiological" recovery, log records refer to database pages and slot numbers; for logical recovery, log records refer to indexes and unique key values; and for semantic recovery, log records refer to tables and primary keys. Physical recovery may be used in database systems and, in the form of mirroring, and may be in many file systems; physiological recovery has been the default choice in databases; logical recovery can restore a database on an entirely different device, including storage and memory without pages; and semantic recovery can restore a database for a different purpose, e.g., transaction processing versus query processing with different choices in physical database design such as partitioning, index selection, and compression. Semantic log records and recovery are particularly useful in the context of replication by log shipping, including log shipping with a selection predicate. Logical recovery focuses on version numbers attached to unique key values. Log records contain backward chains by unique key value and checkpoint log records contain a list of possibly dirty (unwritten) unique key values. The equivalent to flushing dirty pages is writing a unique key value and all associated information. Log archiving for logical recovery sorts log records by key value.

The Example of the Introduction

For the example of the introduction, the new data structures and algorithms enable a new balance between merge performance and search performance, (e.g., merge bandwidth and search latency). The difference is that the search effort shrinks by a factor 3 without affecting the merge effort. Alternatively, the merge fan-in can grow by a factor 3 without affecting the search effort.

Table 2 shows the newly available choices for fan-in and merge levels. With the same merge effort (e.g., 6 levels), the search effort is cut to a third compared to Table 1 (from 54 to 18 partitions). With the same search effort (e.g., 54 partitions), the merge effort is cut to half (from 6 to 3 merge levels). A balanced choice requires twice the optimal merge effort (4 versus 2 merge levels) and twice the optimal search effort (30 versus 15 partitions). This is also a near-optimal choice in Table 2. Compared to the near-optimal choice in Table 1, the techniques employ a 2½× larger merge fan-in (6 in Table 1 versus 15 in Table 2) and permit 1½× faster merge (6 merge levels in Table 1 versus 4 merge levels in Table 2) with almost 2× faster search (54 partitions in Table 1 versus 30 partitions in Table 2), as promised in the abstract.

In the application motivating this research, an alternative performance metric is this: if each query may search a limit number of delta, e.g., up to 30 deltas, how close to real-time can query results be? For example, in Table 1, real-time queries are not possible with a limit to 30 deltas. A strict limit to 30 delta limits queries to querying older data, thus creating an artificial latency from data ingestion to first query. For example, a fan-in of 4 requires 8 merge levels in Table 1. With 6 runs per merge level on average, 5 merge levels can be queried; runs on the most recent 3 merge levels may be omitted from queries. Thus, the artificial delay is 1 minute times 43 or over an hour.

TABLE 2

Merge and search minutes within a month, improved.

| Levels | Fan-in | Search |
|---|---|---|
| 2 | 212 | 212 |
| 3 | 36 | 54 |
| 4 | 15 | 30 |
| 5 | 9 | 23 |
| 6 | 6 | 18 |
| 7 | 5 | 18 |
| 8 | 4 | 16 |
| 10 | 3 | 15 |
| 16 | 2 | 16 |

Alternatively, a weaker limit to 50 deltas requires 8, 10, or even 16 merge levels for real-time queries. In other words, each input row goes back and forth between memory and storage 8, 10, or even 16 times. In contrast, with the techniques underlying Table 2, 4 merge levels suffice to limit queries to 30 deltas. In other words, half the merge effort (trips per row between memory and storage) permits a latency from ingest to first query not achievable with any merge fan-in using the original techniques underlying Table 1.

Another Example

For another example, consider minutes in a year, with $60 \times 24 \times 366 = 527{,}040 \approx 3^{12} = 531{,}441 \approx 2^{19} = 524{,}288$. One possible merge plan employs 6 merge levels with fan-in 9.

TABLE 3

Merge and search minutes within a year.

| Merge | | Search effort | |
|---|---|---|---|
| levels | Fan-in | Old | New |
| 2 | 726 | 2,178 | 726 |
| 3 | 81 | 365 | 122 |
| 4 | 27 | 162 | 54 |
| 5 | 14 | 105 | 35 |
| 6 | 9 | 81 | 27 |
| 12 | 3 | 54 | 18 |
| ~19 | 2 | 57 | 19 |

Table 3 shows example calculations for one-minute runs over an entire year (366 days). Two merge levels combine one-minute runs about every 12½ hours (726 minutes), for about 726 runs at the end of the year (or precisely every 12 hours for 732 runs at the end of a leap year). For optimal search performance, there should be 12 merge levels. In the old merging scheme, 12 merge levels imply an average query effort of searching 54 runs; if searching 54 runs is acceptable, the merging scheme requires 4 merge levels, with 3× less merge effort.

Focusing on the alternative performance metric, the 6-level merge of Table 3, and a limit of 30 deltas per query, the merging scheme for log-structured merge-trees queries runs in the highest two merge levels (data 4 days or older); whereas the merging scheme permits querying all runs, with effectively real-time query results as desirable for monitoring and for online dashboards.

SUMMARY AND CONCLUSIONS

In summary, b-tree indexes and log-structured merge-trees may be used with the techniques described herein. The linear partitioned b-trees and staggered merging, may not dissolve the tension between fast merge and fast search, but they alleviate the pain by reducing the average (expected) number of partitions to be searched in each query and by reducing both merge and search effort at balanced or near-optimal tradeoff choices.

In conclusion, practically any data warehouse and any web analytics applications should use log-structured merge-trees for continuously growing tables and their indexes, but they should use optimal policies and mechanisms. Linear partitioned b-trees and staggered merging may save a lot of data center resources and costs.

While the present design covers many aspects of information capture and incremental merging in log-structured merge-trees, with a particular focus on the in-memory ordered index coordinating all merge and search activities. The present design covers rollups (materialized "group by" views) as well as secondary indexes (which may be regarded as particularly simple materialized views), but it does not cover materialized join views, (views combining two or more tables, indexes, or other materialized views). A detailed design is left to future work, but a few suggestions may be permitted here.

If one of the join inputs is a stream, then that stream may be indexed using the techniques presented earlier. The other join input(s) should have suitable indexes such that streamed input can be joined and the result applied to the materialized join. Applying the join output may itself use the techniques described above. (The materialized join view is materialized and indexed as a log-structured merge-tree its primary index as well as any secondary indexes.

If both join inputs are streams, they both ought to be indexed using the techniques described above. As input arrives, it is joined with the other table's indexes and the join result is materialized and indexed as a log-structured merge-tree, hopefully optimized as described in this present disclosure.

C. Computer Architecture

FIG. 12 shows the general architecture of an illustrative computer system 1200 that may be employed to implement any of the computer systems discussed herein in accordance with some implementations. The computer system 1200 can be used to provide information via the network 810 for display. The computer system 1200 of FIG. 12 comprises one or more processors 1220 communicatively coupled to memory 1225, one or more communications interfaces 1205, and one or more output devices 1210 (e.g., one or more display units) and one or more input devices 1215. The processors 1220 can be included in the data processing system 100 or the other components of the system 800 such as the data processing system 805.

In the computer system 1200 of FIG. 12, the memory 1225 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 800 of FIG. 8, the data processing systems can include the memory 1225 to store information related to the sets of user identifiers, the generated vectors, among others. The processor(s) 1220 shown in FIG. 12 may be used to execute instructions stored in the memory 1225 and, in so doing, also may read from or write to the memory various information processed and or generated pursuant to execution of the instructions.

The processor 1220 of the computer system 1200 shown in FIG. 12 also may be communicatively coupled to or control the communications interface(s) 1205 to transmit or receive various information pursuant to execution of instructions. For example, the communications interface(s) 1205 may be coupled to a wired or wireless network, bus, or other communication means and may therefore allow the computer system 1200 to transmit information to or receive information from other devices (e.g., other computer systems). While not shown explicitly in the system of FIG. 12, one or more communications interfaces facilitate information flow between the components of the system 1200. In some implementations, the communications interface(s) may be configured (e.g., via various hardware components or software components) to provide a website as an access portal to at least some aspects of the computer system 800. Examples of communications interfaces 1205 include user interfaces (e.g., web pages), through which the user can communicate with the data processing system 1200.

The output devices 1210 of the computer system 1200 shown in FIG. 12 may be provided, for example, to allow various information to be viewed or otherwise perceived in connection with execution of the instructions. The input device(s) 1215 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as the data processing systems 805 can include clients and servers. For example, the data processing systems 805 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the data processing system 805 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to controlling the display of content of information resources, the systems and methods described herein can include applied to other environments. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method of maintaining key-value stores, comprising:
    establishing, by a data processing system having one or more processors, on a first buffer, a first run for sorting a first plurality of records, the first plurality of records initially indexed by a first corresponding plurality of index values, each record of the first plurality of records having a first key value in a key domain, the key domain defining a plurality of key values;
    tracking, by the data processing system, using a merge index, a progress of a merging of the first plurality of records of the first run onto a merge level maintained on a database, the merge index referencing the first key value of a record of the first plurality of records added to the merge level during the merging;
    establishing, by the data processing system, concurrent to the merging of the first plurality of records, a second run for sorting a second plurality of records on a second buffer, the second plurality of records indexed by a second corresponding plurality of index values different from the first plurality of index values, each record of the second plurality of records having a second key value in the key domain;
    determining, by the data processing system, that the merge index tracking the progress of the merging of the first plurality of records onto the merge level satisfies a quantile condition, the quantile condition corresponding to a switch-over key value of the plurality of key values in the key domain, the quantile condition being configured for staggered merging of the first plurality of records and the second plurality of records;
    identifying, by the data processing system, responsive to determining that the merge index corresponds to the quantile condition, a subset of the second plurality of records of the second run from the second buffer, each record of the subset having a corresponding second key value satisfying the quantile condition; and
    adding, by the data processing system, responsive to determining that the merge index corresponds to the quantile condition, the subset of the second plurality of records of the second run to the merging of the first plurality of records, prior to completion of the merging of the first plurality of records, for performing the staggered merging of the first plurality of records and the second plurality of records.

2. The method of claim 1, further comprising:
determining, by the data processing system, the switch-over key value based on a ratio of the merge index and a quantile index specified by the quantile condition; and
determining, by the data processing system, a bandwidth offset based on a merge bandwidth of the database, the merge bandwidth indicating a rate at which the database is adding the first plurality of records and the subset of the second plurality of records is merged, and
wherein determining that the merge index satisfies the quantile condition further comprises determining that the merge index satisfies the switch-over key value adjusted by the bandwidth offset.

3. The method of claim 1, further comprising:
tracking, by the data processing system, using a run index, establishing of the second run using the second plurality of records, the run index referencing a number of the second plurality of records sorted in the second run; and
determining, by the data processing system, that the second key value of a record of the second plurality of records referenced by the run index has satisfies the quantile condition, and
wherein adding the subset of the second plurality of records further comprises initiating the adding of the subset of the second plurality of records of the second run to the merging, concurrent to establishing of the second run and responsive to determining that second key value of the record referenced by the run index satisfies the quantile condition.

4. The method of claim 1, further comprising:
identifying, by the data processing system, a first run generation rate of establishing the first run on the first buffer, the first run generation rate indicating a speed at which records of the first plurality of record are sorted in the first run;
identifying, by the data processing system, a second run generation rate of establishing the second run on the second buffer, the second run generation rate indicating a speed at which records of the second plurality of record are sorted in the second run; and
setting, by the data processing system, a merge bandwidth for adding the first plurality of records of the first run onto the database based on at least one of the first run generation rate and the second run generation rate.

5. The method of claim 1, further comprising:
identifying, by the data processing system, a distribution of a corresponding plurality of first key values over the key domain for the first plurality of records;
determining, by the data processing system, a plurality of quantile conditions including the quantile condition based on the distribution of the corresponding plurality of first key values over the key domain, the plurality of quantile conditions configured for staggering a multi-way merge of a respective plurality of runs.

6. The method of claim 1, further comprising:
determining, by the data processing system, while merging the subset of the second plurality of records and the first plurality of records on the merge level, that all of the first plurality of records of the first run are added to the merge level on the database;
releasing, by the data processing system, responsive to determining that all of the first plurality of records of the first run are added, the first buffer from the first plurality of records to receive a third plurality of records for a third run; and
maintaining, by the data processing system, the second plurality of records on the second buffer concurrent to merging the subset of the second plurality of records onto the merge level on database.

7. The method of claim 1, further comprising:
determining, by the data processing system, that the merging of the first plurality of records and the subset of the second plurality of records onto the merge level on the database is complete; and
initializing, by the data processing system, responsive to determining that the merging onto the merge level is complete, a third run on a second merge level on the database to receive merging of at least a remaining subset of the second plurality of records of the second run.

8. The method of claim 1, further comprising:
receiving, by the data processing system, a query for at least one of the plurality of key values defining the key domain; and
searching, by the data processing system, using the query, the merge level on the database, the merge level comprising records from a number of runs.

9. The method of claim 1, wherein merging the subset of the second plurality of records further comprises tracking, using a second merge index, a progress of a merging of the subset of the second plurality of records onto the merge level on the database, the second merge index referencing the second key value of one of the second plurality of records added to the merge level during the merging, the second merge index initially set based on the quantile condition.

10. The method of claim 1, wherein establishing the first run further comprises sorting the first plurality of records by a corresponding plurality of first key values over the key domain using at least one of a quick sort or a priority queue, the first plurality of records initially arranged by the first corresponding plurality of index values, and wherein establishing the second run further comprises:
receiving, from a data acquisition source via an input data stream, the second plurality of records for storage on the second buffer, the second plurality of records initially arranged by the second corresponding plurality of index values, and
sorting the second plurality of records by a corresponding plurality of second key values over the key domain using at least one of a quick sort or a priority queue.

11. A system for maintaining key-value stores, comprising:
a data processing system having one or more processors, configured to:
establish, on a first buffer, a first run for sorting a first plurality of records, the first plurality of records initially indexed by a first corresponding plurality of index values, each record of the first plurality of records having a first key value in a key domain, the key domain defining a plurality of key values;
track, using a merge index, a progress of a merging of the first plurality of records of the first run onto a merge level maintained on a database, the merge index referencing the first key value of a record of the first plurality of records added to the merge level during the merging;
establish, concurrent to the merging of the first plurality of records, a second run for sorting a second plurality of records on a second buffer, the second plurality of records indexed by a second corresponding plurality of index values different from the first plurality of index values, each record of the second plurality of records having a second key value in the key domain;

determine that the merge index tracking the progress of the merging of the first plurality of records onto the merge level satisfies a quantile condition, the quantile condition corresponding to a switch-over key value of the plurality of key values in the key domain, the quantile condition being configured for staggered merging of the first plurality of records and the second plurality of records;

identify, responsive to determining that the merge index corresponds to the quantile condition, a subset of the second plurality of records of the second run from the second buffer, each record of the subset having a corresponding second key value satisfying the quantile condition; and add, responsive to determining that the merge index corresponds to the quantile condition, the subset of the second plurality of records of the second run to the merging of the first plurality of records, prior to completion of the merging of the first plurality of records, for performing the staggered merging of the first plurality of records and the second plurality of records.

12. The system of claim 11, wherein the data processing system is further configured to:

determine the switch-over key value based on a ratio of the merge index and a quantile index specified by the quantile condition;

determine a bandwidth offset based on a merge bandwidth of the database, the merge bandwidth indicating a rate at which the database is adding the first plurality of records and the subset of the second plurality of records is merged; and determine that the merge index satisfies the switch-over key value adjusted by the bandwidth offset.

13. The system of claim 11, wherein the data processing system is further configured to:

track, using a run index, establishing of the second run using the second plurality of records, the run index referencing a number of the second plurality of records sorted in the second run; and determine that the second key value of a record of the second plurality of records referenced by the run index has satisfies the quantile condition, and initiate the adding of the subset of the second plurality of records of the second run to the merging, concurrent to establishing of the second run and responsive to determining that second key value of the record referenced by the run index satisfies the quantile condition.

14. The system of claim 11, wherein the data processing system is further configured to:

identify a first run generation rate of establishing the first run on the first buffer, the first run generation rate indicating a speed at which records of the first plurality of record are sorted in the first run;

identify a second run generation rate of establishing the second run on the second buffer, the second run generation rate indicating a speed at which records of the second plurality of record are sorted in the second run; and set a merge bandwidth for adding the first plurality of records of the first run onto the database based on at least one of the first run generation rate and the second run generation rate.

15. The system of claim 11, wherein the data processing system is further configured to:

identify a distribution of a corresponding plurality of first key values over the key domain for the first plurality of records;

determine a plurality of quantile conditions including the quantile condition based on the distribution of the corresponding plurality of first key values over the key domain, the plurality of quantile conditions configured for staggering a multi-way merge of a respective plurality of runs.

16. The system of claim 11, wherein the data processing system is further configured to:

determine, while merging the subset of the second plurality of records and the first plurality of records on the merge level, that all of the first plurality of records of the first run are added to the merge level on the database;

release, responsive to determining that all of the first plurality of records of the first run are added, the first buffer from the first plurality of records to receive a third plurality of records for a third run; and maintain the second plurality of records on the second buffer concurrent to merging the subset of the second plurality of records onto the merge level on database.

17. The system of claim 11, wherein the data processing system is further configured to:

determine that the merging of the first plurality of records and the subset of the second plurality of records onto the merge level on the database is complete; and initialize, responsive to determining that the merging onto the merge level is complete, a second merge level on the database to receive merging of at least a remainder subset of the second plurality of records of the second run.

18. The system of claim 11, wherein the data processing system is further configured to:

receive a query for at least one of the plurality of key values defining the key domain; and search, using the query, the merge level on the database, the merge level comprising records from a number of runs.

19. The system of claim 11, wherein the data processing system is further configured to track, using a second merge index, a progress of a merging of the subset of the second plurality of records onto the merge level on the database, the second merge index referencing the second key value of one of the second plurality of records added to the merge level during the merging, the second merge index initially set based on the quantile condition.

20. The system of claim 11, wherein the data processing system is further configured to:

sort the first plurality of records by a corresponding plurality of first key values over the key domain using at least one of a quick sort or a priority queue, the first plurality of records initially arranged by the first corresponding plurality of index values;

receive, from a data acquisition source via an input data stream, the second plurality of records for storage on the second buffer, the second plurality of records initially arranged by the second corresponding plurality of index values; and sort the second plurality of records by a corresponding plurality of second key values over the key domain using at least one of a quick sort or a priority queue.

\* \* \* \* \*